United States Patent
Silvi et al.

(10) Patent No.: US 7,053,168 B2
(45) Date of Patent: May 30, 2006

(54) METHOD FOR PREPARING POLYIMIDE AND POLYIMIDE PREPARED THEREBY

(75) Inventors: Norberto Silvi, Clifton Park, NY (US); Mark Howard Giammattei, Selkirk, NY (US); Paul Edward Howson, Latham, NY (US); Farid Fouad Khouri, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 10/683,226

(22) Filed: Oct. 10, 2003

(65) Prior Publication Data

US 2005/0080228 A1    Apr. 14, 2005

(51) Int. Cl.
*C08G 73/00*    (2006.01)
*C08F 6/00*    (2006.01)
*C08L 79/00*    (2006.01)

(52) U.S. Cl. ............... 528/170; 528/125; 528/126; 528/128; 528/171; 528/172; 528/173; 528/174; 528/176; 528/183; 528/185; 528/188; 528/220; 528/229; 528/350; 528/353; 528/480; 528/502 R; 525/420; 525/422; 525/425; 525/432; 525/436; 264/176.1

(58) Field of Classification Search ............... 528/353, 528/170, 183, 480, 502 R, 125–126, 128, 528/220, 171–174, 185, 188, 229, 350, 176; 264/165, 176.1, 169, 204, 209.6, 216, 211.24, 264/331.19; 525/420, 422, 425, 432, 436
See application file for complete search history.

(56) References Cited

U.S. PATENT DOCUMENTS

| | | | |
|---|---|---|---|
| 3,451,462 A | 6/1969 | Szabo et al. | |
| 3,803,085 A | 4/1974 | Takekoshi et al. | |
| 3,833,544 A | 9/1974 | Takekoshi et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White | |
| 3,905,942 A | 9/1975 | Takekoshi et al. | |
| 3,983,093 A | 9/1976 | Williams et al. | |
| 3,991,004 A | 11/1976 | Takekoshi et al. | |
| 3,998,840 A | 12/1976 | Williams et al. | |
| 4,011,198 A | 3/1977 | Takekoshi et al. | |
| 4,073,773 A | 2/1978 | Banucci et al. | |
| 4,324,882 A | 4/1982 | Takekoshi et al. | |
| 4,443,591 A | 4/1984 | Schmidt et al. | |
| 4,443,592 A | 4/1984 | Schmidt et al. | |
| 4,511,535 A | 4/1985 | Schmidt et al. | |
| 4,550,156 A * | 10/1985 | Gallagher | 528/185 |
| 4,585,852 A * | 4/1986 | Lo et al. | 528/185 |
| 4,680,373 A * | 7/1987 | Gallagher et al. | 528/185 |
| 4,686,279 A | 8/1987 | Nagtzaam et al. | |
| 4,689,391 A | 8/1987 | Peters et al. | |
| 4,769,476 A * | 9/1988 | Howson | 549/241 |
| 4,835,249 A * | 5/1989 | Gallagher et al. | 528/353 |
| 5,106,938 A * | 4/1992 | Bookbinder et al. | 528/176 |
| 5,189,137 A * | 2/1993 | Howson et al. | 528/171 |
| 5,283,021 A | 2/1994 | Shih | |
| 5,480,616 A | 1/1996 | Richardson et al. | |
| 5,589,111 A | 12/1996 | Haruta et al. | |
| 5,633,319 A * | 5/1997 | Silvi et al. | 525/133 |
| 6,361,724 B1 * | 3/2002 | Maeda et al. | 264/85 |
| 6,906,168 B1 * | 6/2005 | Khouri et al. | 528/480 |
| 2005/0070684 A1 * | 3/2005 | Gallucci et al. | 528/170 |

FOREIGN PATENT DOCUMENTS

| | | |
|---|---|---|
| CA | 1063761 | 10/1979 |
| EP | 0 274 602 | 7/1988 |
| EP | 0 364 376 | 4/1990 |
| EP | 0541 055 | 5/1993 |

OTHER PUBLICATIONS

PCT Search Report—Jan. 21, 2005.
JP58147332 Abstract Only Sep. 2, 1983 Hanamura Teizou et al.
JP11268098 Abstract Only Oct. 5, 1999 Takamoto Seiji.
JP6093014 Abstract Only Apr. 5, 1994 Tanaka Koji et al.
U.S. Appl. No. 10/648,647, filed Aug. 26, 2003, Paul W. Buckley et al.
U.S. Appl. No. 10/648,604, filed Aug. 26, 2003, Jiawen Dong et al.

* cited by examiner

*Primary Examiner*—P. Hampton Hightower
(74) *Attorney, Agent, or Firm*—Cantor Colburn LLP

(57) ABSTRACT

A method for preparing a polyimide includes introducing a mixture of an oligomer and a solvent to an extruder, removing solvent via at least one extruder vent, and melt kneading the oligomer to form a polyimide. The polyimide has a low residual solvent content. The method is faster than solution polymerization of polyimides, and it avoids the stoichiometric inaccuracies associated with reactive extrusion processes that use monomers as starting materials.

56 Claims, 3 Drawing Sheets

METHOD FOR PREPARING POLYIMIDE AND POLYIMIDE PREPARED THEREBY

BACKGROUND OF THE INVENTION

One known process for the preparation of polyimides is solution polymerization. This process includes a first step, in which a diamine compound and a dianhydride compound react in solution to form a partially polymerized polyimide, and a second step, in which the polymerization is completed and solvent is removed. The second step typically requires a residence time on the order of hours, and it also requires substantial capital investment in the form of gear pumps required to transport the molten polymer, and evaporation equipment required to remove the solvent and any water formed as a product of the polymerization and imidization reactions. This process allows carefully controlled proportions of the diamine and dianhydride reactant, but its long residence times, high temperatures, and exposure of the molten polyimide to atmospheric air often result in the degradation of the polyimide and its physical properties.

Another known process for the preparation of polyimides is melt polymerization. Melt polymerization is conducted in a single reactive extrusion step in which the diamine and dianhydride reactants are fed to an extruder, where they react to form a polyimide. This process is substantially faster and less capital-intensive than solution polymerization. It is also useful for the preparation of high molecular weight polyimides, as well as polyimides having high glass transition temperatures. However, it does not allow for precise control of reactant stoichiometry. As a result the polyimide produced is not consistent in quality. A further disadvantage of conventional melt polymerization techniques is that the reaction mixture passes through a so-called "cement stage" as the polyamic acid intermediate is formed. During this phase of the reaction, the mixture of reactants becomes very viscous and thus difficult to process. Because of these disadvantages, melt polymerization is not widely practiced commercially.

It would therefore be advantageous to synthesize polyimide by a method that provides the precise control of reactant stoichiometry and manageable viscosities offered by the solution polymerization, as well as the substantial time and equipment cost savings offered by melt polymerization.

BRIEF DESCRIPTION OF THE INVENTION

The above-described and other drawbacks are alleviated by a method of preparing a polyimide, comprising: introducing to an extruder an oligomer mixture comprising a solvent and an oligomer formed by the reaction of a dianhydride compound and a diamine compound; removing solvent from the oligomer mixture via a vent in the extruder; and melt kneading the oligomer to form a polyimide.

Other embodiments, including a polyetherimide prepared by the method, are described in detail below.

BRIEF DESCRIPTION OF THE DRAWINGS

Referring now to the drawings wherein like elements are numbered alike in several Figures.

DETAILED DESCRIPTION OF THE INVENTION

Figure 1:
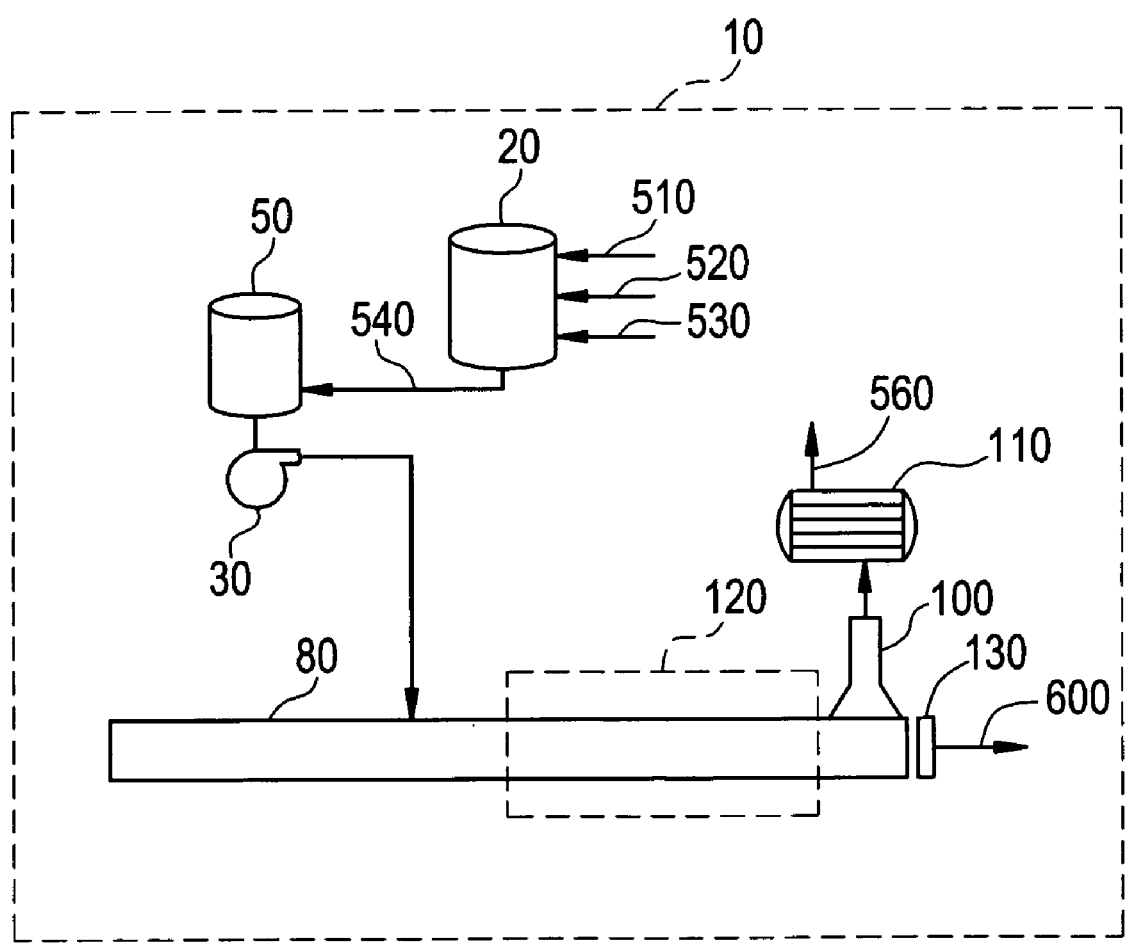
FIG. 1 is a simplified diagram of a system for practicing the method; a single downstream vent is employed.

One embodiment is a method of preparing a polyimide, comprising: introducing to an extruder an oligomer mixture comprising a solvent and an oligomer formed by the reaction of a dianhydride compound and a diamine compound; removing solvent from the oligomer mixture via a vent in the extruder; and melt kneading the oligomer to form a polyimide. The present inventors have discovered that the present method provides an advantageous and heretofore unobtainable combination of precise control of reactant stoichiometry and substantial time and equipment cost savings.

The method comprises introducing to an extruder an oligomer mixture comprising a solvent and an oligomer formed by the reaction of a dianhydride compound and a diamine compound. The dianhydride compound may have the structure

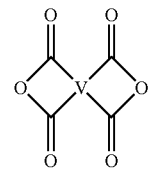

wherein V is a tetravalent linker selected from (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof. Preferred dianhydride compounds include those having the structure

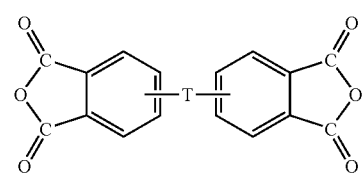

wherein the divalent T moiety bridges the 3,3', 3,4', 4,3', or 4,4' positions of the aryl rings of the respective aryl imide moieties; T is —O— or a group of the formula —O-Z-O—; Z is a divalent radical selected from the following formulae

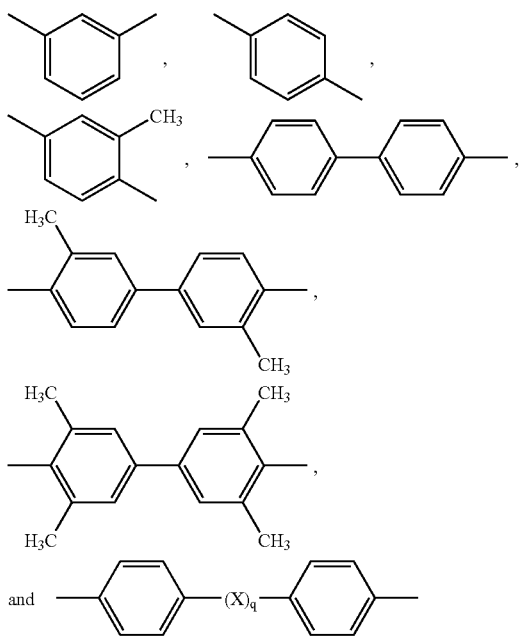

wherein X is a member selected from divalent radicals of the formulae

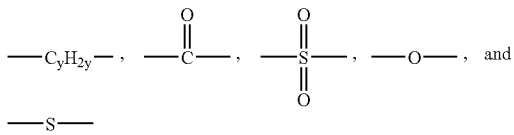

wherein y is an integer of 1 to about 5, and q is 0 or 1. In one embodiment, the dianhydride compound comprises bisphenol A dianhydride (BPADA), which consists of one or more isomers having the structure

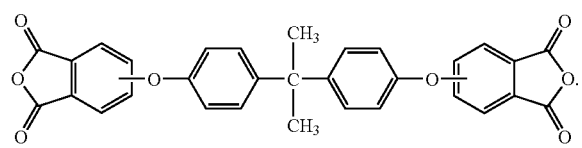

In another embodiment, the dianhydride compound comprises 4,4'-oxy-diphthalic anhydride (ODPA), which consists of one or more isomers having the structure

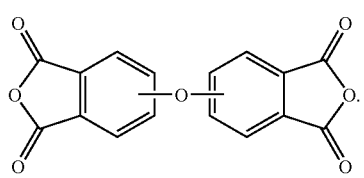

In another embodiment, the dianhydride compound comprises BPADA and ODPA.

The diamine compound may have the structure

wherein R is a divalent organic radical selected from (a) aromatic hydrocarbon radicals having 6 to about 20 carbon atoms and halogenated derivatives thereof, (b) alkylene radicals having 2 to about 20 carbon atoms, (c) cycloalkylene radicals having 3 to about 20 carbon atoms, and (d) divalent radicals of the general formula

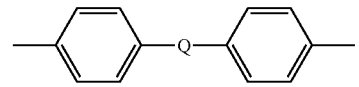

where Q is a covalent bond or a member selected from the formulae

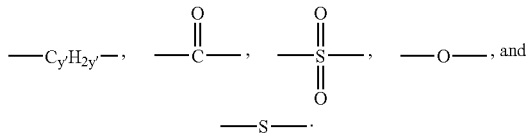

where y' is an integer from 1 to about 5. Specific diamine compound include, for example, m-phenylenediamine, p-phenylenediamine, bis(4-aminophenyl)methane, bis(4-aminophenyl)ether, hexamethylenediamine, 1,4-cyclohexanediamine, diaminodiphenylsulfones such as 4,4'-diaminodiphenylsulfone, and the like, and mixtures thereof. In one embodiment, the diamine compound comprises meta-phenylenediamine (m-PD). In another embodiment, the diamine compound comprises diaminodiphenylsulfone (DDS), which consists of one or more isomers having the structure

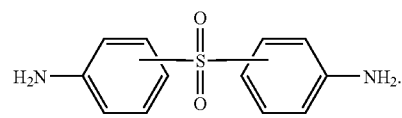

In another embodiment, the diamine compound comprises m-PD and DDS.

The reaction of the dianhydride compound and diamine compound may, optionally, take place in the presence of a so-called chain stopper. Chain stoppers capable of reacting with free amine end groups on the oligomer or the polyimide include, for example, phthalic anhydride. Chain stoppers capable of reacting with free anhydride end groups on the oligomer or the polyimide include, for example, aniline and substituted anilines.

Other specific dianhydride compounds, diamine compounds, and chain stoppers suitable for use in the present invention include those described in, for example, U.S. Pat. No. 3,847,867 to Heath et al., U.S. Pat. No. 3,850,885 to Takekoshi et al., U.S. Pat. No. 3,852,242 and U.S. Pat. No. 3,855,178 to White, U.S. Pat. No. 3,983,093 to Williams et al., and U.S. Pat. No. 5,189,137 to Howson et al.

The reaction of the diamine compound and dianhydride compound takes place in a solvent. Suitable solvents include halogenated aromatic solvents, halogenated aliphatic solvents, non-halogenated aromatic solvents, non-halogenated aliphatic solvents, and mixtures thereof. Halogenated aromatic solvents are illustrated by ortho-dichlorobenzene (ODCB), chlorobenzene, and the like, and mixtures thereof. Non-halogenated aromatic solvents are illustrated by toluene, xylene, anisole, veratrole, trimethoxybenzenes, and the like, and mixtures thereof. Halogenated aliphatic solvents are illustrated by methylene chloride, chloroform, 1,2-dichloroethane, and the like, and mixtures thereof. Non-halogenated aliphatic solvents are illustrated by ethanol, acetone, ethyl acetate, and the like, and mixtures thereof. In one embodiment, the solvent comprises a halogenated aromatic solvent. In one embodiment, the solvent comprises ortho-dichlorobenzene.

The reaction of the diamine compound and dianhydride compound may, optionally, be conducted in the presence of an imidization catalyst, which catalyzes the conversion of amic acid functionality to cyclized imide functionality. Suitable imidization catalysts are known in the art; they include salts of organophosphorus acids, particularly phosphinates such as sodium phenyl phosphinate and heterocyclic amines such as 4-diaminopyridine. Sodium phenyl phosphinate is presently preferred.

Reaction of the dianhydride compound with the diamine compound in the solvent generates an oligomer mixture. In one embodiment, the oligomer mixture is an oligomer solution, which is herein defined as comprising less than 0.1 weight percent of solids. In one embodiment, the oligomer comprises amic acid repeating units having the structure

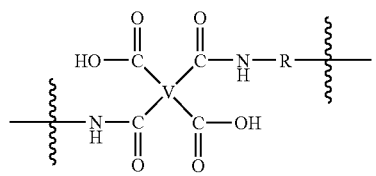

wherein V is a tetravalent linker selected from (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof. In the structure immediately above, R is a substituted or unsubstituted divalent organic radical selected from (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula

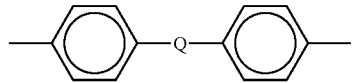

wherein Q is a divalent moiety selected from —O—, —S—, —C(O)—, —SO$_2$—, C$_y$H$_{2y}$—, and halogenated derivatives thereof, wherein y is an integer from 1 to 5. Because the rate of polymerization (i.e., chain growth) may be similar to the rate of imidization, the oligomer may comprise imidized repeat units. Thus, in addition to the amic acid repeat units described above, the oligomer may, optionally, further comprise at least one imidized repeating unit having a structure selected from

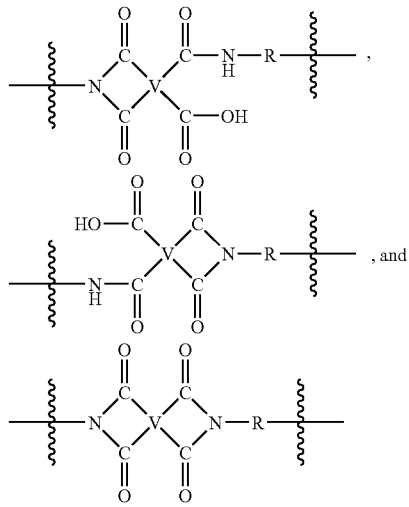

wherein V and R are as defined above.

An oligomer is herein defined as comprising a number average of at least two repeating units. The oligomer may preferably comprise a number average of at least three repeating units, more preferably at least four repeating units, even more preferably at least five repeating units.

In one embodiment, the oligomer comprises repeating units having the structure

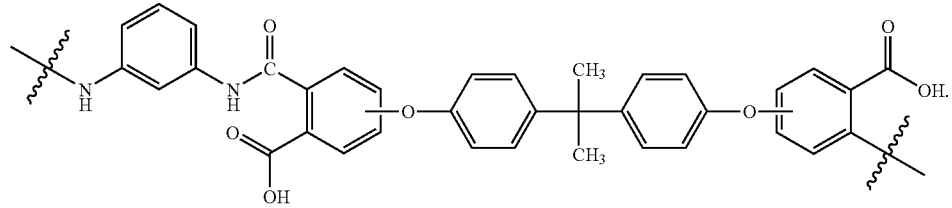

Such units may be derived, for example, from oligomerization of BPADA and m-PD in a suitable solvent. In another embodiment, the oligomer comprises repeating units having the structure

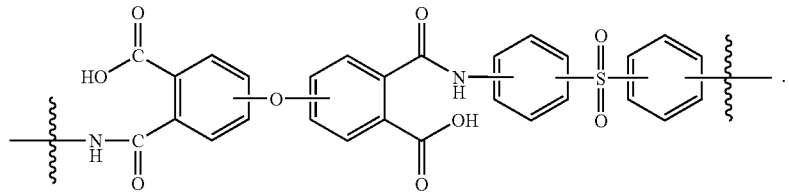

Such units may be derived, for example, from oligomerization of ODPA and DDS in a suitable solvent. In another embodiment, the oligomer is formed from co-oligomerization of at least three monomers selected from bisphenol A dianhydride, 4,4'-oxy-diphthalic anhydride, meta-phenylenediamine, and diaminodiphenylsulfone.

The oligomer may preferably have a weight average molecular weight of about 5,000 to about 40,000 atomic mass units (AMU). Within this range, a weight average molecular weight of at least 10,000 AMU is more preferred. Also within this range, a weight average molecular weight up to 30,000 AMU is more preferred.

The oligomer mixture may comprise about 5 to about 90 weight percent of the oligomer. Within this range, the oligomer content is preferably of at least about 10 weight percent, more preferably at least about 20 weight percent, still more preferably at least about 30 weight percent. Also within this range, the oligomer weight content is preferably up to about 80 weight percent, more preferably up to about 70 weight percent, still more preferably up to about 60 weight percent.

The oligomer mixture may comprise about 10 to about 95 weight percent of the solvent. Within this range, the solvent content is preferably of at least about 20 weight percent, more preferably at least about 30 weight percent, still more preferably at least about 40 weight percent. Also within this range, the solvent content is preferably up to about 90 weight percent, more preferably up to about 80 weight percent, still more preferably up to about 70 weight percent.

The method comprises melt kneading the oligomer to form a polyimide. In one embodiment, the polyimide comprises repeating units having the structure

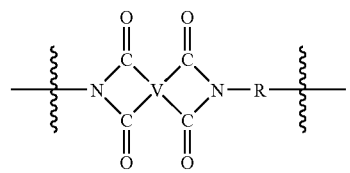

wherein V is a tetravalent linker selected from (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof. In the structure immediately above, R is a substituted or unsubstituted divalent organic radical selected from (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula

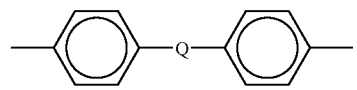

wherein Q is a divalent moiety selected from —O—, —S—, —C(O)—, —SO$_2$—, C$_y$H$_{2y}$—, and halogenated derivatives thereof, wherein y is an integer from 1 to 5. In a preferred embodiment, the polyimide is a polyetherimide. In this embodiment, the ether oxygen may be derived from the dianhydride compound, the diamine compound, or both. In one embodiment, in which the oligomer is prepared from BPADA and m-PD, the polyimide is a polyetherimide comprising repeating units having the structure

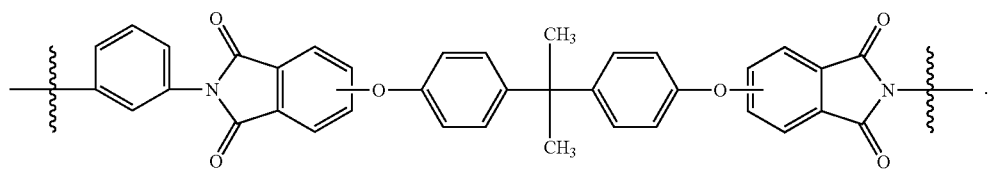

In another embodiment, in which the oligomer is prepared from ODPA and DDS, the polyimide is a polyetherimide comprising repeating units having the structure

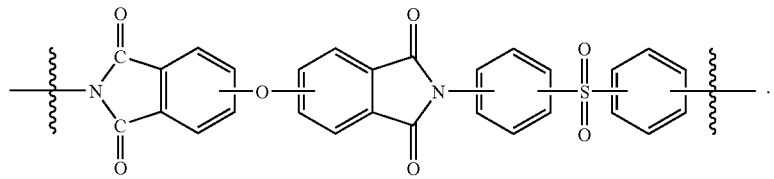

There is no particular molecular weight limit on the polyimide, except that it has a higher molecular weight than the oligomer. In one embodiment, the polyimide comprises a number average of repeating units at least two, preferably at least three, more preferably at least 4, still more preferably at least five repeating units greater than the number average of repeating units in the oligomer.

In one embodiment, the polyimide comprises a number average of repeating units at least 1.2, preferably at least 1.3, more preferably at least 1.4, still more preferably at least 1.5 times greater than the number average of repeating units in the oligomer. Similarly, in one embodiment, the ratio of the polyimide weight average molecular weight to the oligomer weight average molecular weight is about 1.2 to about 10. Within this range, the ratio is at least about 1.5, more preferably at least about 1.8. Also within this range, the ratio is up to about 8, more preferably up to about 6, still more preferably up to about 4.

In one embodiment, the polyimide has a weight average molecular weight greater than 30,000 to about 80,000 AMU. Within this range, the polyimide weight average molecular weight is preferably at least about 35,000 AMU, more preferably at least about 40,000 AMU. Also within this range, the polyimide weight average molecular weight is preferably up to about 70,000 AMU, more preferably up to about 60,000 AMU. One advantage of the method is that it produces a polyimide having a lower polydispersity than polyimides produced by reactive extrusion methods in which the dianhydride compound and the diamine compound are fed directly to the extruder. Thus, in one embodiment, the polyimide has a polydispersity index less than about 4, preferably less than about 3, more preferably less than about 2.5. The polydispersity index is the ratio of the weight average molecular weight to the number average molecular weight. Another advantage of the method is that it can produce polyimides of very high molecular weight, which could not be obtained using, for instance, a solution polymerization method alone. The molecular weight characteristics of the oligomer and the polyimide may be determined by methods known in the art such as, for example, gel permeation chromatography using appropriate standards.

Another advantage of the method is that it produces a polyimide extrudate with low residual solvent. For example, polyimide produced by the method may comprise less than 1,000, preferably less than 500, more preferably less than 250, still more preferably less than 100, even more preferably less than 50 parts per million by weight of residual solvent. Solvent removal may, optionally, be facilitated by addition of a stripping agent to the extruder. The stripping agent will typically have an atmospheric boiling point below the operating barrel temperature(s) of the extruder. Suitable stripping agents include, for example, nitrogen, water, carbon dioxide including supercritical carbon dioxide, and air. Because some unwanted decomposition pathways for the oligomer and the polyimide are oxidative, it is preferred that the stripping gas is free of oxygen. A presently preferred stripping agent is nitrogen.

Another advantage of the method is that it produces a polyimide with low concentrations of residual anhydride and amine end groups. For example, the polyimide may comprise less than about 1 mole percent, preferably less than 0.5 mole percent, more preferably less than 0.25 mole percent, even more preferably less than 0.1 mole percent, of unreacted anhydride end groups, based on moles of polyimide. A procedure for determining anhydride end groups is described in the working examples, below. Similarly, the polyimide may comprise less than about 1 mole percent, preferably less than 0.5 mole percent, more preferably less than 0.25 mole percent, even more preferably less than 0.1 mole percent, still more preferably less than 0.01 mole percent, of unreacted amine end groups, based on moles of polyimide. A procedure for determining amine end groups is described in the working examples, below.

In a preferred embodiment, the oligomer mixture is superheated when it is introduced to the extruder. The oligomer mixture is superheated when it has a temperature greater than the boiling point of the solvent at atmospheric pressure. Typically, the temperature of the superheated oligomer mixture will be about 2° C. to about 200° C. higher than the boiling point of the solvent at atmospheric pressure. Within this range, a temperature of less than or equal to about 150° C. above the boiling point of the solvent is preferred, with a temperature less than or equal to about 100° C. above the boiling point of the solvent being more preferred. Also preferred within this range, a temperature of greater than or equal to about 10° C. above the boiling point of the solvent is preferred, with a temperature greater than or equal to about 50° C. above the boiling point of the solvent being more preferred. In instances where there are multiple solvents present, the oligomer mixture is superheated with respect to at least one of the solvent components. Where the polymer-solvent mixture contains significant amounts of both high and low boiling solvents, it is sometimes advantageous to superheat the oligomer mixture with respect to all solvents present (i.e., above the boiling point at atmospheric pressure of the highest boiling solvent). Superheating of the oligomer mixture may be achieved by heating the mixture under pressure. Superheating the oligomer mixture facilitates solvent removal because a substantial portion of the solvent evaporates as the mixture enters the extruder.

A condensable gas is considered superheated when it has a temperature above its boiling point at its current pressure. A solvent is therefore super heated when it has a positive degree of superheat, where the degree of superheat is defined by the expression $(P_1^v - P_t)$, which represents the difference between the equilibrium pressure of the solvent in the vapor phase ($P_1'$) and the total pressure in the space of the extruder where the devolatilization process takes place ($P_t$). As described above, one embodiment of superheating the oligomer mixture occurs when the oligomer mixture has a temperature greater than the atmospheric boiling point of at least one of its constituent solvents. Another embodiment of superheating the oligomer mixture occurs when the flash separation of the solvent from the oligomer mixture is accomplished by applying vacuum to the heated mixture so the surrounding pressure is lower than the vapor pressure of the solvent in the mixture. This method is also described herein as superheating as the degree of superheat ($P_1'-P_t$) is a positive value. In other words, an oligomer mixture that is kept at a temperature below the boiling point of the solvent at atmospheric pressure can be in a superheated state as long as the surrounding pressure is lower than the vapor pressure of the solvent at the temperature of the oligomer mixture.

The temperature of the oligomer mixture may be adjusted by conventional means such as, for example, a heat exchanger. The oligomer mixture is preferably introduced to the extruder via a feed inlet in fluid communication with the extruder. Oligomer mixtures comprising less than about 30 percent by weight solvent may be too viscous to be pumped through a heat exchanger, one of the preferred methods for heating the oligomer mixture. In such instances it is possible to heat the oligomer mixture by other means, for example, heating the oligomer mixture in an extruder, or a helicone mixer, or the like. The oligomer mixture may be heated by means of a first extruder. The heated oligomer mixture emerging from the first extruder may be transferred through a pressure control valve into a second devolatilizing extruder equipped according to the method with at least one vent operated at subatmospheric pressure, optionally one or more vents operated at about atmospheric pressure, and at least one side feeder equipped with at least one vent being operated at atmospheric pressure. In one embodiment, the die face of the first extruder may serve as the pressure control valve, which regulates the flow of heated oligomer mixture into the second devolatilizing extruder. In this embodiment the heated oligomer mixture is introduced directly from the die face of the first extruder into the feed zone of the second devolatilizing extruder. The first extruder may be any single-screw extruder or twin-screw extruder capable of heating the oligomer mixture.

When the oligomer mixture is heated above the atmospheric boiling point of the solvent (i.e., when it is pressurized), the system may comprise a pressure control valve downstream of the heat exchanger, if used, or downstream of the feed tank. The pressure control valve preferably has a cracking pressure higher than atmospheric pressure. The cracking pressure of the pressure control valve may be set electronically or manually and is typically maintained at a pressure in the range of about 1 pound per square inch (psi) (0.07 kgf/cm$^2$) to about 350 psi (25 kgf/cm$^2$) above atmospheric pressure. Within this range, the cracking pressure may preferably be at least about 5 psi (0.35 kg/cm$^2$), more preferably at least about 10 psi (0.7 kgf/cm$^2$) above atmospheric pressure. Also within this range, the cracking pressure may preferably be up to less than about 100 psi (7.0 kgf/cm), more preferably up to about 50 psi (3.5 kgf/cm$^2$) above atmospheric pressure. The back pressure generated by the pressure control valve is typically controlled by increasing or decreasing the cross sectional area of the valve opening. Typically, the degree to which the valve is open is expressed as percent (%) open, meaning the cross sectional area of valve opening actually being used relative to the cross sectional area of the valve when fully opened. The pressure control valve prevents evaporation of the solvent as it is heated above its boiling point. Typically, the pressure control valve is attached (plumbed) directly to an extruder and serves as the feed inlet of the extruder. Suitable pressure control valves include, for example, those sold as RESEARCH® Control Valve, manufactured by BadgerMeter, Inc.

In one embodiment the oligomer mixture is introduced through multiple pressure control valves located on the extruder and the side feeder. The system may comprise two side feeders and two pressure control valves, the first of the pressure control valves communicating directly with the feed zone of the extruder (i.e., attached directly to the extruder), and the second of the pressure control valves being attached to one of the side feeders, the second of the pressure control valves communicating with the extruder via the side feeder. Alternatively, it is possible to have a system in which there is no pressure control valve in direct communication with the extruder, having instead multiple side feeders each of which is equipped with at least one pressure control valve.

The oligomer is converted to polyimide by melt kneading. Melt kneading is preferably conducted at a temperature of about 280 to about 400° C. Within this range, the melt temperature is preferably at least about 300° C., more preferably at least about 320° C. Also within this range, the temperature is preferably up to about 380° C., more preferably up to about 360° C. The temperature is typically controlled by selecting and maintaining a separate temperature for each barrel of the extruder. The barrel temperatures of the extruder are usually set at about 120° C. above the glass transition temperature of the polyimide product.

In general, as the feed rate of the oligomer mixture is increased, a corresponding increase in the screw speed must be made in order to accommodate the additional material being fed to the extruder. Moreover, the screw speed contributes to the residence time of whatever material is being fed to the extruder, here an oligomer-solvent mixture. Thus, the screw speed and feed rate are typically interdependent. It is useful to characterize this relationship between feed rate and screw speed as a ratio. Typically the extruder is operated such that the ratio of oligomer mixture introduced into the extruder in kilograms per hour (kg/hr) to the screw speed expressed in revolutions per minute (rpm) is about 0.005 to about 50, preferably about 0.01 to about 0.5, depending on the diameter of the extruder. For example, the ratio of feed rate to screw speed where the oligomer mixture is being introduced into the extruder at 400 kilograms per hour into an extruder being operated at 400 rpm is 1. The maximum and minimum feed rates and extruder screw speeds are determined by, among other factors, the size of the extruder, the general rule being the larger the extruder the higher the maximum and minimum feed rates.

The extruder may comprise any number of barrels, type of screw elements, etc., as long as it is configured to provide sufficient volume for flash evaporation of the solvent as well as the downstream devolatilization of remaining solvent and water by-product. Exemplary extruders include a twin-screw counter-rotating extruder, a twin-screw co-rotating extruder, a single-screw extruder, or a single-screw reciprocating extruder. A preferred extruder is the co-rotating, intermeshing (i.e., self wiping) twin-screw extruder.

A system for carrying out the method may, optionally, further comprise one or more condensing systems to collect the solvent removed via the vent(s). The vents may be connected to a solvent removal and recovery manifold comprising solvent vapor removal lines, a condenser, and a liquid solvent receiving vessel. Any solvent collection system known in the art may be used to recover solvent via the vents.

Solvent may, optionally, be removed from the oligomer mixture before it is introduced to the extruder. This solvent removal may be effected by conventional means in, for example, the reaction vessel used to prepare the oligomer mixture. When an oligomer mixture feed tank separate from the reaction vessel is employed, solvent removal may be effected from the feed tank. Alternatively, solvent removal may be effected in an evaporator or distillation apparatus separate from the reaction vessel or feed tank.

One of the advantages of the invention is that it allows for precise control of reaction stoichiometry. This stoichiometry is primarily controlled via the additions of dianhydride compound, diamine compound, and any other reactants at the beginning of oligomer synthesis. However, the stoichiometry of the resulting oligomer mixture may be analyzed, and any unexpected stoichiometric imbalance may be corrected via addition of dianhydride compound, diamine compound, or other reactants prior to introduction of the oligomer mixture to the extruder. Such a correction may be effected, for example, in the oligomer reaction vessel, or in a separate oligomer mixture feed tank.

When the oligomer mixture is an oligomer solution, it may, optionally, be filtered before introduction to the extruder. Such a filtration may occur before and/or after heating above the solvent boiling point. A preferred solution filtration system is one that is in direct communication with the extruder via a pressure control valve attached directly to the extruder. A highly preferred solution filtration system is an in-line metal filter. Alternatively, the extruder may optionally comprise a melt filtration system for filtering the polymer melt in the extruder. Filtration may also be conducted on the polyimide melt. Suitable filtering devices for oligomer solution and polyimide melt include, for example, the 13 micron sintered metal filters sold by PALL Corporation. Additional descriptions of melt and solution filtration methods and equipment may be found in co-pending U.S. application Ser. Nos. 10/648,647 and 10/648,604, both filed Aug. 26, 2003.

The method may, optionally, be used to form polymer blends comprising the polyimide and another polymer. Thus, the method may further comprise adding to the extruder, downstream from oligomer mixture introduction, a polymer such as a polycarbonate, a poly(arylene ether), a polyester, a polysulfone, a polyetherketone, a polyolefin, a polysiloxane, a poly(alkenyl aromatic) compound, a liquid crystalline polymer, or the like, or a mixture thereof. These additional polymers and methods for their preparation are known in the art. The additional polymer may be added as a solid. Alternatively, the additional polymer may be added as a polymer mixture comprising the additional polymer and a solvent. When present, the additional polymer may be added in an amount of about 1 to about 95 weight percent, based on the total of the polyimide and the additional polymer.

The method may, optionally, be used to add other components to the polyimide. For example, the method may comprise adding to the extruder, downstream from solution introduction, a filler or an additive. Suitable fillers include, for example, conductive fillers, non-conductive fillers, particulate fillers, fibrous fillers, and the like, and mixtures thereof. When present, the filler may be used in an amount of about 0.1 to about 50 weight percent based on the total weight of the composition, preferably from about 1 to about 20 weight percent. Suitable additives include, for example, colorants, pigments, dyes, ultraviolet light stabilizers, antioxidants, heat stabilizers, foaming agents, mold release agents, and the like, and mixture thereof. Where present, the additive may be used in an amount of about 0.0001 to about 10 weight percent, preferably about 0.0001 to about 1 weight percent, based on the total weight of the composition.

In another embodiment, the oligomer mixture may comprise at least one filler and/or at least one additive prior to its introduction into the extruder. It has been found that the pre-dispersal of filler into the oligomer mixture allows for the efficient and uniform distribution of the filler in the resulting isolated polymer product matrix. The lower viscosity of the oligomer mixture allows for efficient mixing of the filler and polyimide with a minimized usage of energy as compared to compounding the filler and polyimide in an extruder or similar device. A further advantage of adding the filler to the oligomer mixture rather than compounding it in an extruder is to minimize the heat history of the polyimide.

In some situations, it may be desirable to add more components than can be conveniently added to a single extruder, or to reduce the residual solvent level below that achievable with a single extruder. In such situations, the method may, optionally, further comprise introducing the polyimide into a second extruder. Thus, the extruder into which the oligomer mixture is first introduced may be coupled to a second extruder, the second extruder optionally being equipped with one or more subatmospheric or atmospheric vents for the removal of residual solvent. The second extruder may be closely coupled to the initial extruder thereby avoiding any intermediate isolation and re-melting steps. The use of a second extruder in this manner is especially beneficial during operation at high throughput rates where the residence time of the polyimide in the initial extruder is insufficient to achieve the desired low level of residual solvent. The second extruder may be any extruder such as a twin-screw counter-rotating extruder, a twin-screw co-rotating extruder, a single-screw extruder, or a single-screw reciprocating extruder. Where the second extruder comprises a plurality of vents, some vents may be operated at atmospheric pressure while others are operated at subatmospheric pressure.

One embodiment is a method of preparing a polyimide, comprising: introducing to an extruder an oligomer mixture comprising an oligomer and a solvent, wherein the oligomer mixture is superheated; removing solvent from the oligomer mixture via a vent upstream from oligomer mixture introduction and a vent downstream from oligomer mixture introduction; and melt kneading the oligomer to form a polyetherimide. Solvent removal may, optionally, be effected by removing solvent via at least two vents downstream from solution introduction. The vent upstream from oligomer mixture introduction is preferably maintained at a pressure in the range of about 10 to about 760 millimeters of mercury. Within this range, the upstream vent pressure may preferably be at least about 50 millimeters of mercury. Also within this range, the upstream vent pressure may preferably be up to about 750 millimeters of mercury. The vent downstream from oligomer mixture introduction is preferably maintained at a pressure of about 10 to about 500 millimeters of mercury. Within this range, the downstream vent pressure may preferably be at least about 25 millimeters of mercury, more preferably at least about 50 millimeters of mercury. Also within this range, the downstream vent pressure may preferably be up to about 300 millimeters of mercury, more preferably up to about 200 millimeters of mercury. The upstream vent may, optionally, be located on a side feeder. Location of the upstream vent on a side feeder provides for added volume and serves to trap and return polymer particles entrained by the escaping solvent vapors. Generally, from about 50 to about 99 percent, preferably from about 90 to about 99 percent of the solvent present in the oligomer mixture is removed through the upstream vent(s) and a substantial portion of any solvent remaining is removed through the downstream vent(s).

One embodiment is a method of preparing a polyetherimide, comprising: introducing to an extruder an oligomer mixture comprising an oligomer and a solvent, wherein the oligomer is formed by the reaction of bisphenol A dianhydride and meta-phenylenediamine, wherein the solvent comprises ortho-dichlorobenzene, and wherein the oligomer mixture is superheated; removing solvent from the oligomer mixture via a vent upstream from oligomer mixture introduction, at least one vent downstream from oligomer mixture introduction, and at least one vent still further downstream from oligomer mixture introduction; wherein the vent upstream from oligomer mixture introduction is maintained at a pressure in the range of about 10 to about 760 millimeters of mercury, the vent downstream from oligomer mixture introduction is maintained at a pressure of about 250 to about 500 millimeters of mercury, and the vent still further down stream from oligomer mixture introduction is maintained at a pressure of about 10 to about 100 millimeters of mercury; and melt kneading the oligomer to form a polyetherimide comprising less than 500 parts per million by weight of residual solvent.

The method may include oligomer synthesis. Thus, one embodiment is a method of preparing a polyimide, comprising: reacting a dianhydride compound and a diamine compound in the presence of a solvent to form an oligomer mixture comprising an oligomer and a solvent; introducing the oligomer mixture to an extruder; removing solvent from the oligomer mixture via a vent in the extruder; and melt kneading the oligomer to form a polyimide. Oligomer synthesis may, optionally, comprise removing water formed as a product of oligomerization and/or imidization.

The invention further includes the polyimides prepared by any of the above methods. Polyimides isolated according to the methods described herein may be transformed into useful articles directly, or they may be blended with one or more additional polymers or polymer additives and subjected to injection molding, compression molding, extrusion methods, solution casting methods, and like techniques to provide useful articles. Injection molding is frequently the preferred method of forming the useful articles.

The figures provide non-limiting, illustrative examples of systems suitable for performing the method. FIG. 1 is a simplified diagram of a polyimide preparation system 10. Reactor 20 is charged via inputs including dianhydride compound addition 510, diamine compound addition 520, and solvent addition 530. Reaction forms an oligomer mixture 540, which flows to oligomer mixture holding tank 50. A gear pump 30 transfers the oligomer mixture to the extruder 80. The extruder has a single vent 100, located downstream of oligomer mixture addition. Volatiles are pumped to a vacuum 560 source via a condenser 110. The extruder employs mixing and kneading elements in a reaction zone 120 to convert the oligomer to polyimide, which exits the extruder at die 130 as an extrudate 600.

Figure 2:
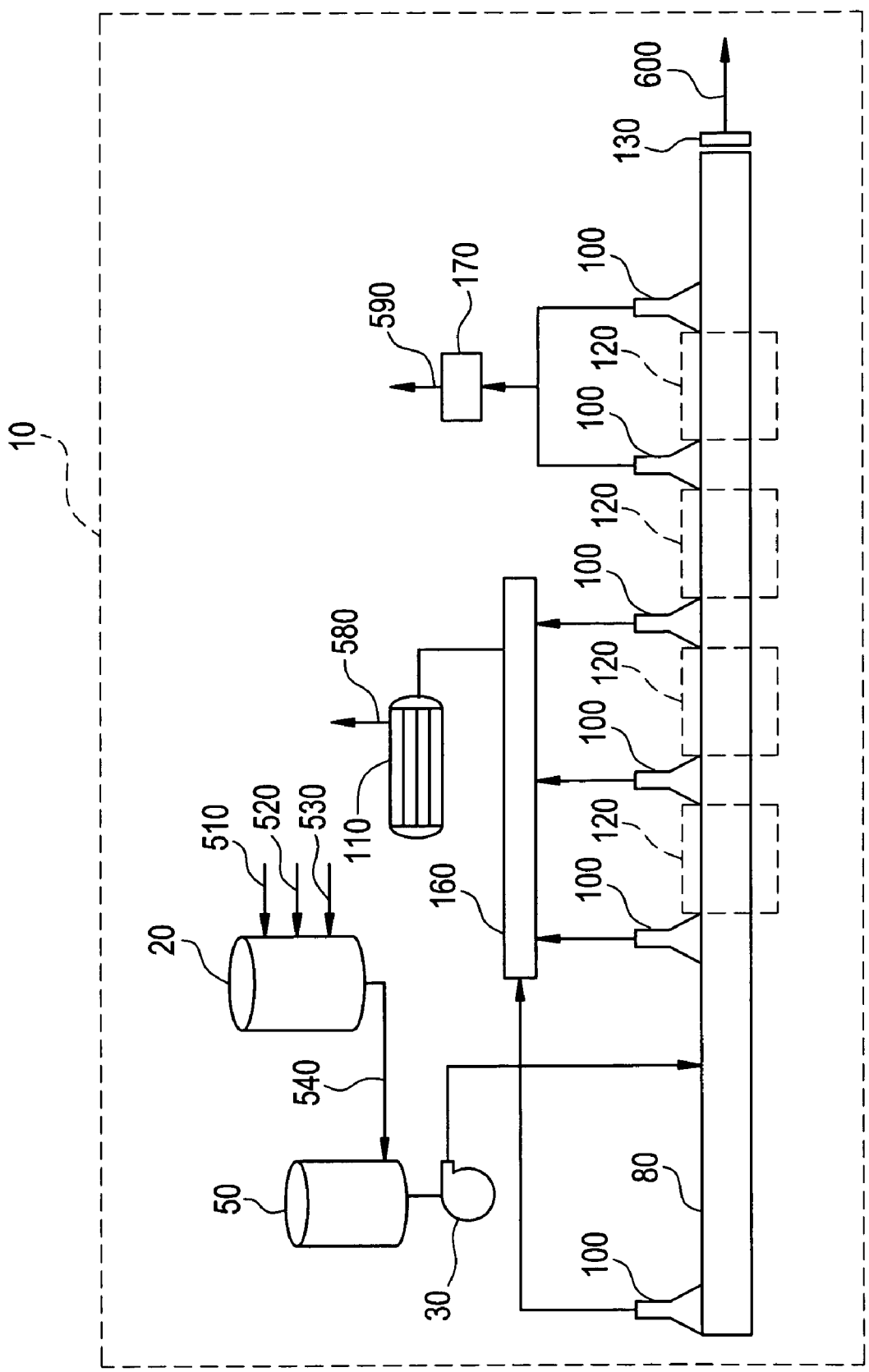
FIG. 2 is a simplified diagram of another system for practicing the method; an upstream vent and five downstream vents are employed; volatile components exiting the extruder are condensed.

FIG. 2 is a simplified diagram of another polyimide preparation system 10. Reactor 20 is charged via inputs including dianhydride compound addition 510, diamine compound addition 520, and solvent addition 530. Other components, such as a monoanhydride chain-stopper, may, optionally, be added. Reaction forms an oligomer mixture 540, which is preferably an oligomer solution. The oligomer mixture flows to oligomer mixture holding tank 50. A gear pump 30 transfers the oligomer mixture to the extruder 80. The extruder employs mixing and kneading elements in four reaction zones 120, which are in between vents. In other sections of the extruder, conveying elements are used. The extruder pictured has six vents 100, one upstream and five downstream of the oligomer mixture addition point. The first four vents (counting upstream to downstream) are combined at vacuum manifold 160 and maintained at a low pressure (e.g., 25–100 mm Hg) by a moderate vacuum 580 source, such as a vacuum pump. Any condensable volatiles are removed by a condenser 110. The fifth and sixth vents are maintained at a low pressure (e.g., 25–50 mm Hg) by a high vacuum 590 source, such as a vacuum pump. Any condensable volatiles are removed by a cold trap 170. The extrudate 600 is formed at the die 130.

Figure 3:
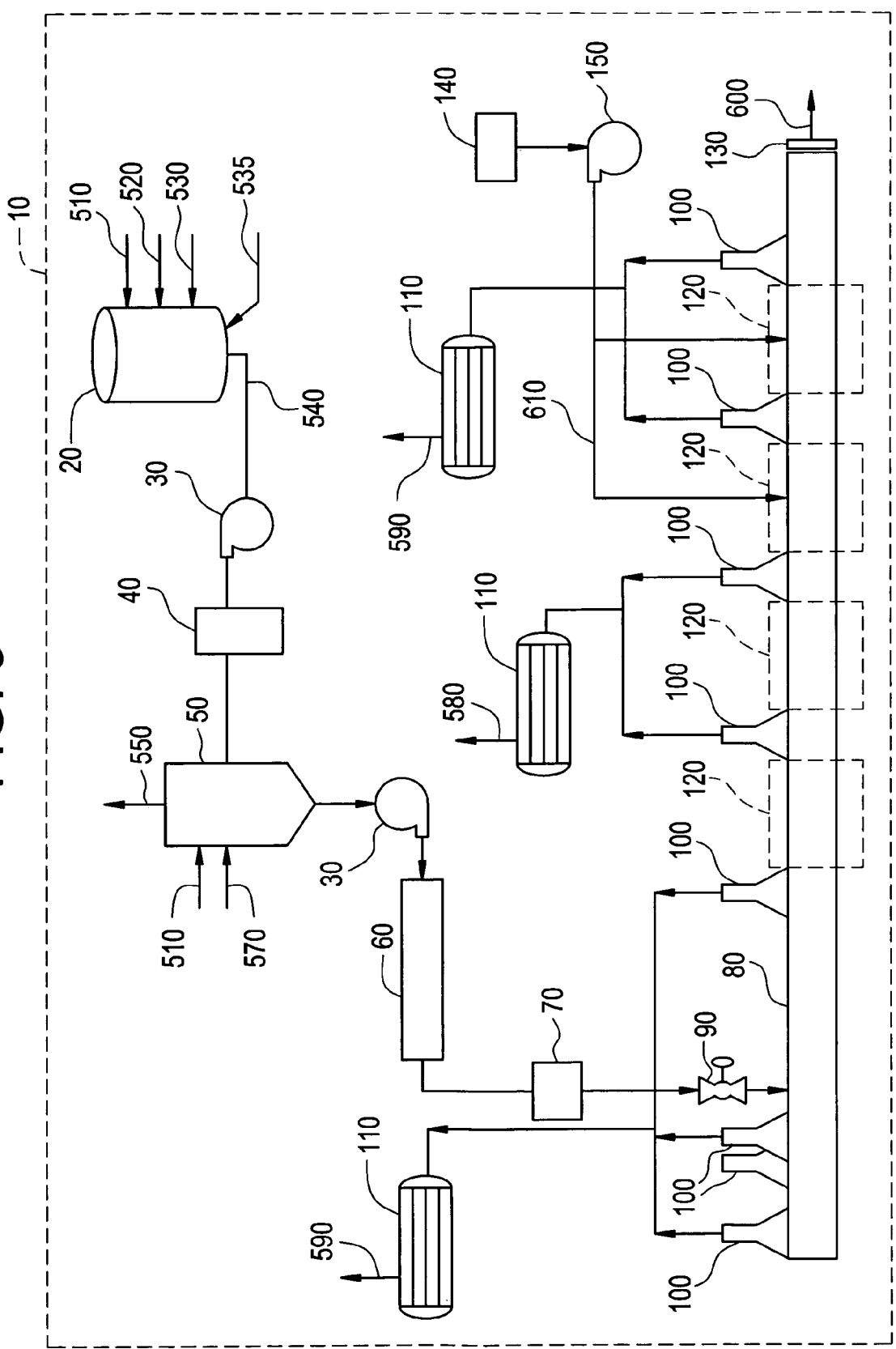
FIG. 3 is a simplified diagram of another system for practicing the method; three upstream vents and the first downstream vent are maintained at atmospheric or slightly sub-atmospheric pressure and the four remaining downstream vents are maintained at sub-atmospheric pressure; two of the upstream vents are associated with side feeders; melt temperature, die pressure, and extruder torque are monitored and used to adjust the process using monomer inputs to the oligomer tank; a stripping agent may, optionally, be injected into the downstream portion of the extruder to facilitate solvent removal.

FIG. 3 is a simplified diagram of another polyimide preparation system 10. Reactor 20 is charged via inputs including dianhydride compound addition 510, diamine compound addition 520, solvent addition 530, and chain stopper addition 535. Reaction forms an oligomer mixture 540, which is preferably an oligomer solution. The oligomer mixture is pumped via gear pump 30 and flow meter 40 to oligomer mixture holding tank 50. There, evaporated solvent 550 may, optionally, be removed. The stoichiometry may, optionally, be adjusted via inputs including dianhydride compound addition 510 and diamine compound addition 520. Another gear pump 30 transfers the oligomer mixture through a heat exchanger 60 to heat the oligomer mixture to a temperature above the atmospheric boiling point of the solvent. If the oligomer mixture is a solution, it may, optionally, be filtered by a solution filtration unit 70. The oligomer mixture enters the extruder 80 via the inlet valve 90. The extruder employs mixing and kneading elements in the reaction zones 120. In other sections of the extruder, conveying elements are used. The extruder pictured has eight vents 100, three upstream and five downstream of the oligomer mixture addition point. The first four vents (counting upstream to downstream) are maintained at a pressure only slightly less than atmospheric (e.g., 500–760 mm Hg) by a weak vacuum 570 source, and any condensable volatiles are removed by a condenser 110. The fifth and sixth vents are maintained at a moderate pressure (e.g., 250–500 mm Hg) by a moderate vacuum 580 source, and any condensable volatiles are removed by a condenser 110. The seventh and eighth vents are maintained at a low pressure (e.g., 25–100 mm Hg) by a high vacuum 590 source, and any condensable volatiles are removed by a condenser 110. For high vacuum maintained via a vacuum pump, it may be preferred that the condenser is a cold trap. The extrudate 600 is formed at the die 130. Melt temperature and pressure may, optionally, be monitored at the die. Low levels of residual solvent in the extrudate 600 are facilitated by stripping agent injection 610, which is effected by a stripping agent source 140 and a pump 150.

All ranges disclosed herein are inclusive of the endpoints, and the endpoints are combinable with each other.

The invention is further illustrated by the following non-limiting examples.

PREPARATIVE EXAMPLE 1

This example describes the preparation of an oligomer mixture. The reactive mixture consisted of 14,000 grams of bisphenol A dianhydride (BPADA), 2,940.98 grams of meta-phenylenediamine (mPD), 177.1 grams of phthalic anhydride (PA), and 30,109 grams of ortho-dichlorobenzene (o-DCB). A 50-gallon glass reactor was charged with o-DCB, BPADA, and PA, and the mixture stirred at room temperature overnight. The mixture was then heated to 160° C. under nitrogen, and molten mPD was added in increments to the reactive mixture over a period of about 24 minutes. As water started to form in the reactor, the temperature of the reactive mixture decreased from about 157.1° C. at the beginning of the mPD addition to about 146.8° C. at the end. Samples of the solution mixture taken from the reactor at different times showed that the molecular weight of the oligomer ($M_w/M_n$/PDI) was 18966/8767/2.163 after 30 minutes of reaction, and 25013/11197/2.234 after about 45 minutes from the time when the mPD was completely added in the reactor. This solution containing oligomers having a weight average molecular weight of about 25,000 AMU was dropped into a non-stirred heated tank and used as feed to the reactive extruder for polymerization and devolatilization.

EXAMPLES 1–5

The oligomer solution from Preparative Example 1, containing about 35 weight percent of oligomer in o-DCB was continuously fed to an extruder from a heated tank kept at about 165–170° C. The extruder set-up was similar to that described for FIG. 2, above. The extruder was a 25 millimeter diameter, co-rotating, intermeshing extruder of the twin-screw type, and it included 14 barrels (total extruder length to diameter ratio, L/D, of 56), and six vents for the elimination of volatile components. The oligomer solution was added to the extruder at barrel number 4. The solvent o-DCB was removed from the process through vacuum vents located at barrels number 1 (back vent), and 5, 7, 9, 11, and 13 (forward vents). All of the extruder vents were operated at a relatively high level of vacuum corresponding to a pressure of approximately 25 millimeters of mercury. Vent 2, at barrel 5, did not have a vacuum gauge. The screws of the extruder were designed to provide relatively long residence times for reaction, and intense surface area renewal for efficient flash/trace devolatilization balance. The extruder was run at about 5 kilograms/hour of polymer, 250 rpm screw speed, 80–90% of maximum torque (maximum torque is typically about 100 newton-meters), and about 385° C. melt temperature. There were no processing problems (strand dropping, vent plugging, etc.) with the polymerization and devolatilization of oligomer solution through the reactive extruder. Some build-up of molecular weight of the polymer in the solution inside the feed tank was observed during the approximately two hours it took for the experiment to be completed, from a weight average molecular weight of about 25,000 AMU at the beginning of the experiment to about 39,000 AMU at the end. No stabilizers were added to the oligomer solution fed to the extruder.

The polyimide produced by this method showed a weight average molecular weight of about 52,500 to 54,500, with a polydispersity between about 2.5 and 2.6. These molecular weight properties are similar to those of the polyetherimide sold commercially by General Electric Company as ULTEM® 1000. The polyimide also exhibited rheological properties indistinguishable from those of ULTEM® 1000. Five extrudates were taken at various times corresponding to modest variations in barrel temperatures during the two hours of extrusion. Barrel temperatures were monitored in eight zones; a ninth temperature measurement was conducted at the die face. See Table 1.

Levels of residual ortho-dichlorobenzene (o-DCB) were determined by gas chromatography using a Hewlett Packard 6890 gas chromatograph as follows. A precisely weighed sample of about 0.25 grams of polyimide pellets was placed in a 20 milliliter vial. To the vial was added five milliliters of a solution of 4 milliliters bromobenzene in 4 liters HPLC-grade dichloromethane. The vial was capped and shaken until all solids had dissolved. A portion of the resulting solution was transferred to a gas chromatography sample vial and capped. The sample was analyzed by gas chromatography using flame ionization detection. Ortho-dichlorobenzene was quantified by comparison of the sample o-DCB peak area to peak areas for previously run o-DCB standard solutions. Each of the five extrudates had an o-DCB concentration less than the 10 parts per million by weight limit of detection for the test.

The extrudates had solution yellowness index (YI) values between 13 and 14 measured according to ASTM E313, molded YI values between 80 and 84 measured according to ASTM D6290, and they were 0.3–0.4 mole percent amine rich relative to the target stoichiometry of equimolar dianhydride and diamine. The glass transition temperature ($T_g$) of the polyimide was 219.5° C.

Results are given in Table 1. They show that the polyimides had high molecular weights, low polydispersities, and acceptable yellowness indices.

TABLE 1

|  | Ex. 1 | Ex. 2 | Ex. 3 | Ex. 4 | Ex. 5 |
| --- | --- | --- | --- | --- | --- |
| Pressure at vent 1 (mm Hg) | 25 | 25 | 25 | 25 | 25 |
| Pressure at vent 3 (mm Hg) | 25 | 25 | 25 | 25 | 25 |
| Pressure at vent 4 (mm Hg) | 25 | 25 | 25 | 25 | 25 |
| Pressure at vent 5 (mm Hg) | 25 | 25 | 25 | 25 | 25 |
| Pressure at vent 6 (mm Hg) | 25 | 25 | 25 | 25 | 25 |
| Oligomer solution feed rate (kg/hour) | 13.9 | 13.9 | 13.9 | 13.9 | 11.9 |
| Torque (% of maximum) | 78 | 84 | 90 | 90 | 90 |
| Melt Temperature at die (° C.) | 387 | 383 | 379 | 385 | 387 |
| Screw speed (rpm) | 249 | 250 | 249 | 249 | 249 |
| Die pressure (kilopascals) | 1413 | 1586 | 1655 | 1607 | 1586 |
| Zone 1 temperature (° C.) | 324 | 333 | 334 | 335 | 335 |
| Zone 2 temperature (° C.) | 351 | 350 | 349 | 349 | 350 |
| Zone 3 temperature (° C.) | 298 | 302 | 303 | 304 | 308 |
| Zone 4 temperature (° C.) | 351 | 350 | 350 | 350 | 350 |
| Zone 5 temperature (° C.) | 350 | 350 | 350 | 350 | 350 |
| Zone 6 temperature (° C.) | 350 | 350 | 350 | 350 | 350 |

TABLE 1-continued

|  | Ex. 1 | Ex. 2 | Ex. 3 | Ex. 4 | Ex. 5 |
| --- | --- | --- | --- | --- | --- |
| Zone 7 temperature (° C.) | 355 | 349 | 350 | 350 | 350 |
| Zone 8 temperature (° C.) | 349 | 345 | 340 | 350 | 350 |
| Die face temperature (° C.) | 349 | 342 | 340 | 350 | 350 |
| Oligomer solution tank temperature (° C.) | 165 | 167 | 167 | 168 | 170 |
| $M_w$ (AMU) | 52501 | 53206 | 53275 | 54295 | 54665 |
| $M_n$ (AMU) | 20486 | 20637 | 20595 | 20836 | 21720 |
| PDI | 2.563 | 2.578 | 2.587 | 2.606 | 2.517 |
| Anhydride end groups (mole %) | 0.034 | 0.065 | 0.062 | 0.041 | 0.006 |
| Amine end groups (mole %) | 0.466 | 0.403 | 0.388 | 0.369 | 0.306 |
| Residual o-DCB (ppm) | 5 | 8 | 9 | 9 | 5 |
| Solution YI | 13.0 | 13.2 | 13.3 | 13.7 | 14.2 |
| Molded YI | 80.4 | 81.0 | 81.0 | 82.3 | 84.0 |

PREPARATIVE EXAMPLE 2

The reactive mixture consisted of 14,050 grams of BPADA, 2,941 grams of mPD, 177.1 grams of PA, and 30.1 kilograms of o-DCB. The BPADA amount was 50 grams greater than that in Preparative Example 1 to compensate for the amine-rich product of that example. A 50-gallon glass reactor was charged with o-DCB, BPADA and PA, and the mixture stirred at room temperature overnight. The mixture was then heated to 160° C. under nitrogen, and molten mPD was added in increments to the reactive mixture over a period of about 36 minutes. As water started to form in the reactor, the temperature of the reactive mixture decreased from about 155.2° C. at the beginning of the mPD addition to about 152.5° C. at the end. Samples of the solution mixture taken from the reactor at different times showed that the molecular weight of the oligomer ($M_w/M_n$/PDI) was 25873/11060/2.339 after 15 minutes of reaction, and 28544/12225/2.335 after about 45 minutes, both taken from the time when the mPD was completely added in the reactor. This solution containing oligomers having a weight average molecular weight of about 28,500 was dropped into a non-stirred, heated tank and used as feed to the reactive extruder for polymerization and devolatilization. Since the sample taken after 15 minutes in the reactor was shown to have aim stoichiometry (0.127 mole % of dianhydride and 0.127 mole % of amine), no correction was made in the reacting solution as this was left to react for another 30 minutes (without stirring) before dropping it into the feed tank of the extruder.

EXAMPLES 6–13

A solution from Preparative Example 2, containing about 35 percent by weight of oligomer in o-DCB, was continuously fed to an extruder from a heated tank kept at about 140–150° C. The extruder was a 25 millimeter diameter co-rotating, intermeshing extruder of the twin-screw type, and it included 14 barrels (L/D=56), and six vents for the elimination of volatile components. The oligomer solution was added to the extruder at barrel number 4. The solvent o-DCB was removed from the process through vacuum vents located at barrels number 1 (back vent), and 5, 7, 9, 11 and 13 (forward vents). All of the extruder vents were operated at a relatively high level of vacuum (corresponding to an absolute pressure of about 25–50 millimeters of mercury). Vents 2 (at barrel 5) and 6 (at barrel 13) lacked pressure gauges. The screws of the extruder were designed to provide relatively long residence time for reaction, and intense surface area renewal for efficient flash/trace devolatilization balance. The extruder was run at about 5 kilograms/hour of polymer, 250 rpm screw speed, 80–90% of maximum torque, and about 385° C. melt temperature. There were no processing problems (strand dropping, vent plugging, etc.) with the polymerization and devolatilization of the oligomer solution through the reactive extruder.

Some build-up of molecular weight in the oligomer solution inside the feed tank was observed during the approximately 2.5 hours it took for the experiment to be completed, from a weight average molecular weight of about 28,500 AMU at the beginning of the experiment to about 47,000 AMU at the end. The heater connected to the feed tank was turned off during the experiment in an effort to prevent further reaction in the holding tank. No stabilizers were added to the oligomer solution fed to the extruder.

Product polymer compositions were analyzed for the concentration of residual amine and anhydride endgroups by FTIR on films prepared from the product polymers on a Carver press. The Fourier transform infrared (FTIR) absorption spectrum was measured and the intensities of the IR absorption bands for amine and anhydride functional groups were compared with the intensity of an absorption band chosen from the sample spectrum to serve as the reference absorption band. The resultant values were then compared to a set of calibration values obtained from a series of films prepared from standards of the product polymer containing known amounts of amine and anhydride functional groups and analyzed using an identical FTIR method to produce a quantitative measure of amine and anhydride endgroup concentration in the product polymer composition. End group concentrations are expressed in mole percent relative to moles of polyimide.

Extrusion conditions and analytical results for eight extrudates are summarized in Table 2. The polyimide produced by this method showed a weight average molecular weight of about 52,200 to 54,900, with a polydispersity of about 2.6 to 2.8. These molecular weight properties are similar to those of the polyetherimide sold commercially by General Electric Company as ULTEM® 1000. The polyimide also exhibited rheological properties indistinguishable from those of ULTEM® 1000. The eight extrudates analyzed had residual o-DCB levels less than or equal to 6 ppm, and solution YI values of about 14 to 17, and they were slightly (0.02–0.08 mole percent) dianhydride rich.

TABLE 2

|  | Ex. 6 | Ex. 7 | Ex. 8 | Ex. 9 | Ex. 10 | Ex. 11 | Ex. 12 | Ex. 13 |
|---|---|---|---|---|---|---|---|---|
| Pressure at vent 1 (mm Hg) | 25 | 50 | 50 | 50 | 50 | 50 | 50 | 50 |
| Pressure at vent 3 (mm Hg) | 25 | 25 | 25 | 25 | 25 | 25 | 25 | 25 |
| Pressure at vent 4 (mm Hg) | 25 | 25 | 25 | 25 | 25 | 25 | 25 | 25 |
| Pressure at vent 5 (mm Hg) | 25 | 25 | 25 | 25 | 25 | 25 | 25 | 25 |
| Oligomer solution feed rate (kg/hour) | 11.9 | 13.9 | 13.9 | 13.9 | 13.9 | 13.9 | 11.9 | 11.9 |
| Torque (%) | 77 | 81 | 83 | 84 | 86 | 87 | 82 | 86 |
| Melt Temperature at die (° C.) | 387 | 385 | 385 | 385 | 386 | 386 | 410 | 375 |
| Screw speed (rpm) | 252 | 250 | 250 | 250 | 250 | 250 | 401 | 178 |
| Die pressure (kilopascals) | TLTM* | TLTM* | 138 | 965 | 1020 | 1041 | 421 | 421 |
| Zone 1 temperature (° C.) | 307 | 312 | 315 | 316 | 317 | 316 | 318 | 318 |
| Zone 2 temperature (° C.) | 348 | 349 | 350 | 350 | 350 | 350 | 351 | 351 |
| Zone 3 temperature (° C.) | 297 | 285 | 285 | 283 | 283 | 282 | 286 | 286 |
| Zone 4 temperature (° C.) | 348 | 350 | 350 | 350 | 350 | 350 | 353 | 347 |
| Zone 5 temperature (° C.) | 351 | 350 | 350 | 350 | 350 | 350 | 352 | 349 |
| Zone 6 temperature (° C.) | 350 | 350 | 350 | 350 | 350 | 350 | 350 | 348 |
| Zone 7 temperature (° C.) | 359 | 350 | 350 | 350 | 350 | 350 | 355 | 348 |
| Zone 8 temperature (° C.) | 352 | 350 | 350 | 350 | 350 | 350 | 353 | 345 |
| Die face temperature (° C.) | 340 | 340 | 340 | 340 | 340 | 340 | 340 | 339 |
| Oligomer solution tank temperature (° C.) | 145 | 152 | — | 146 | 142 | 138 | 135 | 134 |
| Elapsed time at feed tank measurement (minutes) | 10 | 30 | 50 | 70 | 100 | 130 | — | — |
| $M_w$ (AMU) | 53861 | 52862 | 52740 | 52233 | 52399 | 52972 | 54902 | 53688 |
| $M_n$ (AMU) | 19319 | 20657 | 19181 | 19683 | 19861 | 19998 | 20747 | 20410 |
| PDI | 2.788 | 2.559 | 2.750 | 2.654 | 2.638 | 2.649 | 2.646 | 2.630 |
| Anhydride end groups (mole %) | 0.168 | 0.193 | 0.203 | 0.200 | 0.209 | 0.191 | 0.137 | 0.172 |
| Amine end groups (mole %) | 0.151 | 0.165 | 0.166 | 0.154 | 0.142 | 0.125 | 0.054 | 0.104 |
| Anhydride - Amine (mole %) | 0.017 | 0.028 | 0.037 | 0.046 | 0.067 | 0.066 | 0.083 | 0.068 |
| Residual o-DCB (ppm) | — | <5 | <5 | <5 | 5 | 5 | <5 | 6 |
| Solution YI | — | 13.6 | 13.8 | 13.9 | 13.9 | 13.7 | 16.7 | 15.4 |

*TLTM = too low to measure

COMPARATIVE EXAMPLE 1

A lab-scale experiment was run using starting materials similar to those used in Preparative Example 1, but rather than stopping at an oligomer solution, the reaction was run to completion of polymerization and imidization. The reactive mixture consisted of 75 grams of BPADA, 15.76 grams of mPD, 0.95 grams of PA, and 99.76 milliliters of O-DCB. A 250 ml glass reactor was charged with o-DCB, BPADA, mPD and PA, and the mixture heated to 165 C for approximately one hour whereby the bulk of the water of imidization was removed by co-distillation with o-DCB. After that, the temperature of the heating oil bath was raised to allow reflux of o-DCB at the boiling point and the reaction mixture was stirred for 11 hours. Samples were collected from the reactor at reaction times of 30, 50, and 75 minutes, and 2, 3, 4, 5, 6, 8 and 11 hours. Molecular weight analysis of these samples is summarized in Table 3. The results show that relatively long reaction times (up to 11 hours) were needed to react a mixture of BPADA, mPD and PA in a solution with ortho-dichlorobenzene to obtain a polyetherimide having an ULTEM® 1000-like molecular weight. As illustrated by the working examples above, a polymer of similar properties was obtained using the process of this invention by pre-reacting BPADA, mPD and PA in ortho-dichlorobenzene for about 45 minutes in a batch reactor to obtain oligomers of intermediate molecular weight, and then processing this mixture on a reactive extruder designed for reaction and devolatilization to build up the molecular weight of the polymer to the final level and separate the polymer from the solvent it was dissolved in. The residence time of the oligomer mixture in the devolatilization extruder was less than about 2 minutes. The total time required for the process of this invention to produce a polyetherimide of high molecular weight having only traces of residual solvent left was therefore substantially shorter than that for the conventional method.

While not wishing to be bound by any particular hypothesis, the present inventors believe that the better efficiency of the reactor-extruder combination to produce polyetherimides of high molecular weight, compared with the method that uses a batch reactor but no extruder, may be explained in terms of the ability of the reactive extruder to generate interfacial surface area for reaction and devolatilization. The rotation of the screws inside the extruder contribute to bringing the reactants together for the chemical reaction to occur, eliminating the water produced by the condensation reaction so the equilibrium can be moved forward, and ultimately eliminating the relatively large quantities of solvent contained in the reactive solution through the combination of heat, vacuum and surface area renewal. It is also worth mentioning that the polydispersities of the polyetherimide polymers produced by the fully batch method and the reactor-extruder combination process of this invention are very similar suggesting that the residence time provided by the process of this invention to prepare polyetherimides may be adequate to make polyetherimides of the same molecular architecture than the current commercial process. In this respect, it can be said that the process of this invention combines the advantages of the traditional solution polymerization and melt polymerization processes by pre-reacting the monomers in a batch step to ensure a better control of the stoichiometry of the reactive system, and then, once oligomers of the right polydispersity have been formed, the extruder provides the right environment to finish off the polymerization reaction while separating the polymer from the solvent in one single processing step at relatively short residence times.

TABLE 3

|  | C. Ex. 1A | C. Ex. 1B | C. Ex. 1C | C. Ex. 1D | C. Ex. 1E |
|---|---|---|---|---|---|
| Reaction time (hours) | 0.50 | 0.83 | 1.25 | 2 | 3 |
| $M_w$ (AMU) | 15206 | 23777 | 28083 | 34527 | 39361 |
| $M_n$ (AMU) | 7190 | 10875 | 12509 | 15066 | 16418 |
| PDI | 2.115 | 2.186 | 2.245 | 2.292 | 2.397 |

|  | C. Ex. 1F | C. Ex. 1G | C. Ex. 1H | C. Ex. 1I | C. Ex. 1J |
|---|---|---|---|---|---|
| Reaction time (hours) | 4 | 5 | 6 | 8 | 11 |
| $M_w$ (AMU) | 42944 | 45518 | 47832 | 50409 | 52879 |
| $M_n$ (AMU) | 17751 | 18711 | 19398 | 19735 | 21710 |
| PDI | 2.419 | 2.433 | 2.466 | 2.554 | 2.436 |

PREPARATIVE EXAMPLE 3

Using a procedure similar to that described for the preparative examples above, a 35 weight percent solution of oligomer was prepared by the reaction of 14,075 grams of BPADA, 2954.91 grams of mPD, and 197.45 grams of PA in 30.1 kilograms of o-DCB. The oligomers had a weight average molecular weight of about 32,000 AMU. A phosphorus stabilizer, obtained from Ciba Geigy as IRGAFOS® 168, was added to the oligomer solution at 2,200 parts by weight per million weight oligomer.

EXAMPLES 14–19

The oligomer solution from Preparative Example 3 was continuously fed to an extruder from a heated feed tank. The extruder was a 25 millimeter diameter co-rotating intermeshing extruder with ten barrels (length/diameter=40) and a two-hole die plate. The extruder had two vents upstream (one at barrel 1 and one located on a side feeder attached at barrel 2) and four vents downstream (at barrels 4, 5, 7, and 9) of the oligomer feed, which was at the downstream edge of barrel 2. The vents at barrels 1, 2, and 4 were maintained at slightly less than atmospheric pressure (about 735 millimeters of mercury). The vents at barrels 5, 7, and 9 were maintained at much lower pressures (see values in Table 4). Volatiles from all vents were condensed with shell-and-tube condensers. All extruder barrels were set at a temperature of 350° C.; measured barrel temperatures are given in Table 4 as a function of sample. Prior to introducing the oligomer solution, the extruder was purged with about 39 kilograms of a 30 weight percent solution of ULTEM® 1010 polyetherimide in o-DCB, which was run continuously through the extruder for over an hour. The oligomer solution was heated above the boiling point of o-DCB via a heat exchanger in line between the oligomer solution tank and the oligomer feed valve on the extruder. A 13-micron sintered metal filter, obtained from PALL, was installed in the oligomer solution feed line upstream of the extruder to eliminate particulate contaminants. The extrusion isolation process ran well for the entire three-hour experiment without any operator intervention or vent maintenance. Six extrudates were collected and analyzed. Each looked clear with a glossy surface, like a commercial ULTEM® polyetherimide. Concentrations of anhydride end groups and amine end groups were determined as described above. Extrusion conditions and results are summarized in Table 4. Comparisons of weight average molecular weight of oligomer contained in the feed solutions and the corresponding extrudates indicate increases by factors of about 1.25 to about 1.55. The results also show that extruded samples contained acceptably low levels of residual solvent, ranging from 273 to 458 ppm, even when the extruder had a relatively low length to diameter ratio of 40. Residual o-DCB concentrations were all below 500 ppm. Surprisingly, solution yellowness index values were similar to those of commercial ULTEM resins prepared by a much more time- and capital-intensive process. Relatively high concentrations of residual amine and anhydride end groups in the final polyimide suggest that the reaction was not carried out to completion in the extruder, possibly due to the shorter residence time in the ten-barrel extruder compared to the fourteen-barrel extruder. This is also reflected in the weight average molecular weights of these extrudates, where were lower than the expected theoretical molecular weights of about 52,000 to 54,000. Nevertheless, molded plaques prepared from the resins of these examples exhibited good properties under Dynatup (falling dart) conditions (52.5 foot-pound=71.2 joules of energy, 100% ductility at 100° C., compared to a commercial control (54.4 foot-pound=73.8 joules of energy, 100% ductile).

TABLE 4

|  | Ex. 14 | Ex. 15 | Ex. 16 | Ex. 17 | Ex. 18 | Ex. 19 |
|---|---|---|---|---|---|---|
| Pressure at vent 4 (mmHg) | 201 | 125 | 150 | 150 | 150 | 125 |
| Pressure at vent 5 (mmHg) | 201 | 125 | 150 | 150 | 150 | 125 |
| Pressure at vent 6 (mmHg) | 201 | 125 | 150 | 150 | 150 | 125 |
| Oligomer solution feed rate (kg/hour) | 20.9 | 23.1 | 23.1 | 23.1 | 23.1 | 23.1 |
| Torque (%) | 43 | 42 | 44 | 45 | 45 | 45 |
| Melt Temperature at die (° C.) | 369 | 380 | 381 | 380 | 380 | 381 |
| Screw speed (rpm) | 349 | 450 | 450 | 450 | 450 | 450 |
| Zone 1 temperature (° C.) | 357 | 351 | 350 | 350 | 350 | 350 |
| Zone 2 temperature (° C.) | 350 | 339 | 338 | 337 | 336 | 336 |
| Zone 3 temperature (° C.) | 351 | 350 | 350 | 350 | 350 | 350 |
| Zone 4 temperature (° C.) | 343 | 350 | 350 | 350 | 350 | 350 |
| Zone 5 temperature (° C.) | 348 | 351 | 350 | 350 | 350 | 350 |
| Zone 6 temperature (° C.) | 345 | 350 | 351 | 349 | 349 | 350 |
| Zone 7 temperature (° C.) | 350 | 355 | 350 | 351 | 352 | 351 |
| Die face temperature (° C.) | 340 | 341 | 341 | 337 | 341 | 341 |
| Oligomer solution | 149 | 151 | 151 | 152 | 152 | 132 |

TABLE 4-continued

|  | Ex. 14 | Ex. 15 | Ex. 16 | Ex. 17 | Ex. 18 | Ex. 19 |
|---|---|---|---|---|---|---|
| temperature at feed tank (° C.) |  |  |  |  |  |  |
| Oligomer solution temperature before heat exchanger (° C.) | 164 | 165 | 165 | 165 | 165 | 165 |
| Oligomer solution temperature after heat exchanger (° C.) | 277 | 278 | 268 | 266 | 268 | 263 |
| Release pressure of feed valve (kilopascals) | 483 | 586 | 965 | 862 | 724 | 758 |
| Residual o-DCB (ppm) | 273 | 285 | 398 | 328 | 399 | 458 |
| Solution YI | 13.8 | 11.9 | 11.2 | 11.1 | 10.9 | 11.2 |
| Amine end groups (mole %) | 0.310 | 0.519 | 0.401 | 0.554 | 0.588 | 0.593 |
| Anhydride end groups (mole %) | 0.525 | 0.754 | 0.653 | 0.689 | 0.781 | 0.752 |
| Feed Solution $M_w$ (AMU) | 30168 | 33154 | 34871 | 35744 | 36316 | 35690 |
| Feed Solution $M_n$ (AMU) | 14294 | 15439 | 15679 | 16150 | 15700 | 16106 |
| Feed Solution PDI | 2.111 | 2.147 | 2.224 | 2.213 | 2.313 | 2.216 |
| Extrudate $M_w$ (AMU) | 46661 | 43471 | 45076 | 45026 | 44648 | 44440 |
| Extrudate $M_n$ (AMU) | 19825 | 18713 | 19334 | 19175 | 19036 | 18957 |
| Extrudate PDI | 2.354 | 2.323 | 2.331 | 2.348 | 2.345 | 2.344 |

PREPARATIVE EXAMPLE 4

Using a procedure similar to that described for the preparative examples above, a 35 weight percent solution of oligomer was prepared by the reaction of 16,890 grams of BPADA, 3,546.8 grams of mPD, and 236.9 grams of PA in 36.5 kilograms of o-DCB.

EXAMPLES 20–29

The oligomer solution from Preparative Example 4 was continuously fed to an extruder from an insulated, unheated feed tank. The extruder was a 25 millimeter diameter co-rotating intermeshing twin-screw extruder with fourteen barrels (L/D=56) and a two-hole die plate. The extruder had two vents upstream (just upstream of barrels 1 and 4) and four vents downstream (at barrels 7, 9, 11, and 13) of the oligomer feed, which was at the upstream edge of barrel 5. The vents at barrels 1, 4, 7, and 9 were maintained at a pressure of about 25–50 millimeters of mercury using the house vacuum system. The vents at barrels 11 and 13 were maintained at a pressure of about 25 millimeters of mercury using a vacuum pump. Volatiles from vents 1, 4, 7, and 9 were condensed with a shell-and-tube condenser. Volatiles from vents 11 and 13 were condensed in a cold trap. The extruder had conveying elements under the feed and all vents, and kneading blocks in the reaction zones between vents. The oligomer solution was fed using a positive displacement gear pump. The oligomer solution for Examples 20–22 contained no added stabilizer; the oligomer solution for Examples 23–29 contained 2,200 ppm of IRGAFOS® 168. All extruder barrels were set at a temperature of 350° C.; measured barrel temperatures are given in Table 4 as a function of sample. Prior to introducing the oligomer solution, the extruder was purged with ULTEM® 1000 polyetherimide. The oligomer solution was dispensed from an insulated, unheated tank. Ten extrudates were collected and analyzed. The results, in Table 5, show that the extrusion process increased the weight average molecular weight by factors of about 1.1 to about 1.9. The results also show that the final molecular weight distribution of the polyimide is remarkably insensitive to the molecular weight distribution of the feed solution. Residual o-DCB levels were extremely low. The extruded resin appeared slightly darker than commercial resins. The very low levels of amine end groups suggest that the polymerization reaction has approached completion, possibly due to the longer residence time of the fourteen-barrel extruder compared to that of the ten-barrel extruder used in Examples 14–19. The resin was formulated to be slightly anhydride-rich for increased thermal stability.

TABLE 5

|  | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|
| Oligomer solution feed rate (kg/hour) | 13.9 | 13.9 | 13.9 | 13.9 | 13.9 | 13.9 | 13.9 | 13.9 | 16.9 | 19.9 |
| Torque (%) | 70 | 72 | 73 | 72 | 72 | 73 | 74 | 73 | 76 | 76 |
| Melt Temperature at die (° C.) | 390 | 389 | 390 | 390 | 389 | 389 | 390 | 402 | 401 | 400 |
| Screw speed (rpm) | 300 | 300 | 300 | 300 | 300 | 300 | 300 | 400 | 400 | 400 |
| Die pressure (kilopascals) | 131 | 545 | 696 | 627 | 765 | 841 | 862 | 869 | 848 | 848 |
| Zone 1 temperature (° C.) | 335 | 338 | 338 | 338 | 339 | 340 | 341 | 342 | 342 | 342 |
| Zone 2 temperature (° C.) | 349 | 350 | 350 | 349 | 350 | 350 | 350 | 350 | 350 | 350 |
| Zone 3 temperature (° C.) | 320 | 321 | 321 | 320 | 320 | 321 | 321 | 322 | 321 | 319 |
| Zone 4 temperature (° C.) | 350 | 350 | 350 | 350 | 350 | 350 | 350 | 351 | 348 | 344 |
| Zone 5 temperature (° C.) | 351 | 350 | 350 | 351 | 350 | 350 | 350 | 351 | 350 | 350 |
| Zone 6 temperature (° C.) | 350 | 350 | 350 | 350 | 350 | 350 | 350 | 350 | 350 | 350 |
| Zone 7 temperature (° C.) | 351 | 350 | 350 | 351 | 350 | 350 | 350 | 352 | 351 | 351 |

TABLE 5-continued

| | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|
| Zone 8 temperature (° C.) | 351 | 350 | 350 | 350 | 350 | 350 | 350 | 352 | 351 | 350 |
| Die face temperature (° C.) | 340 | 340 | 340 | 340 | 340 | 340 | 340 | 340 | 340 | 340 |
| Residual o-DCB (ppm) | <5 | <5 | <5 | <5 | <5 | <5 | <5 | <5 | <5 | <5 |
| Solution YI | 14.3 | 14.1 | 13.8 | 14.1 | 12.9 | 13.4 | 13.4 | 14.1 | 13.7 | 12.9 |
| Amine end groups (mole %) | 0.014 | 0 | 0 | 0 | 0.026 | 0.017 | 0.019 | 0 | 0.009 | 0.028 |
| Anhydride end groups (mole %) | 0.428 | 0.424 | 0.448 | 0.503 | 0.561 | 0.552 | 0.558 | 0.529 | 0.546 | 0.576 |
| Feed Solution $M_w$ (AMU) | 26896 | — | 43098 | 41263 | — | — | — | — | — | 46484 |
| Feed Solution $M_n$ (AMU) | 13071 | — | 17833 | 18246 | — | — | — | — | — | 19983 |
| Feed Solution PDI | 2.058 | — | 2.417 | 2.261 | — | — | — | — | — | 2.326 |
| Extrudate $M_w$ (AMU) | 51075 | 51336 | 51310 | 50917 | 50567 | 50563 | 50525 | 50859 | 50420 | 50123 |
| Extrudate $M_n$ (AMU) | 21048 | 21124 | 21135 | 21041 | 20921 | 20915 | 20802 | 20947 | 20822 | 20696 |
| Extrudate PDI | 2.427 | 2.430 | 2.428 | 2.420 | 2.417 | 2.418 | 2.429 | 2.428 | 2.422 | 2.422 |

PREPARATIVE EXAMPLE 5

Using a procedure similar to that described for the preparative examples above, a 30 weight percent solution of oligomer was prepared by the reaction of 3,648 grams of BPADA, 2,588 grams of 4,4'-diaminodiphenylsulfone (DDS), 982 grams of 4,4'-oxy-diphthalic anhydride (ODPA), and 108 grams of PA in about 32 liters of o-DCB. The reaction was carried out by first dissolving the DDS and BPADA in o-DCB, which required about one hour at 100° C. The ODPA and PA were then added, and the reactor temperature was gradually raised. The water product evolved when the reaction temperature was about 145–150° C. At that point, the reaction mixture looked like a thin paste. There was a slow molecular weight build. Preliminary stoichiometric analysis indicated an amine excess. The reaction was cooled to 160° C. overnight and further molecular weight build took place. The next morning, most of the o-DCB was removed. The anhydride correction was made by addition of BPADA, and a sampling after 40 minutes showed a slight anhydride excess. A slight amine correction was made by addition of DDS with the intention of leaving a slight excess of anhydride.

EXAMPLES 30–33

The oligomer solution from Preparative Example 5 was continuously fed to an extruder from the titanium reactor in which it was prepared. The extruder was a 25 millimeter diameter co-rotating intermeshing twin-screw extruder with fourteen barrels (L/D=56), a two-hole die plate, and two vents upstream of oligomer addition and four vents downstream of oligomer addition. Conveying screw elements were used under the feed and all vents. Screw kneading blocks were used in the reaction zones between vents. Oligomer was fed just upstream of barrel 5. Vents at barrels 1, 4, 7, and 9 were connected to house vacuum (ca. 50–75 mm Hg) with a shell-and-tube condenser, and vents at barrels 11 and 13 were connected to a vacuum pump (ca. 25 mm Hg absolute pressure) with a cold trap. All barrels were set to a temperature of 350–375° C. The oligomer solution was fed by a gear pump from the reactor, which was maintained at 180° C. Extrusion conditions and results are summarized in Table 6. Based on a pre-extrusion weight average molecular weight of about 19,800 AMU, the weight average molecular weight increased by a factor of about 1.4 on extrusion. These examples demonstrate that the process of the invention can be used to prepare polyimides with relatively high glass transition temperatures. The glass transition temperatures of the polyimides prepared in these examples were about 255–257° C. for the four samples measured. These values may be compared to values of about 217° C. for polyetherimides prepared from BPADA and mPD. Residual solvent levels were extremely low, and the color of the resin was similar to that of other commercially-available polyimides. The residual concentration of amine end groups in the polyimide was relatively low, suggesting that the polymerization was carried out to near-completion in the extruder. The polyimide was anhydride-rich, as it was purposefully formulated to be. The polyimide exhibited low polydispersity.

TABLE 6

| | Ex. 30 | Ex. 31 | Ex. 32 | Ex. 33 |
|---|---|---|---|---|
| Oligomer solution feed rate (kg/hour) | 12.7 | 12.7 | 12.7 | 12.7 |
| Torque (%) | 87 | 83 | 85 | 87 |
| Melt Temperature at die (° C.) | 386 | 387 | 388 | 388 |
| Screw speed (rpm) | 195 | 195 | 195 | 195 |
| Die pressure (kilopascals) | TLTM* | TLTM* | TLTM* | 83 |
| Zone 1 temperature (° C.) | 302 | 317 | 321 | 322 |
| Zone 2 temperature (° C.) | 350 | 375 | 375 | 375 |
| Zone 3 temperature (° C.) | 332 | 344 | 345 | 345 |
| Zone 4 temperature (° C.) | 349 | 375 | 375 | 375 |
| Zone 5 temperature (° C.) | 350 | 376 | 375 | 375 |
| Zone 6 temperature (° C.) | 350 | 350 | 350 | 350 |
| Zone 7 temperature (° C.) | 358 | 349 | 350 | 350 |
| Zone 8 temperature (° C.) | 350 | 350 | 350 | 350 |
| Die face temperature (° C.) | 350 | 350 | 350 | 350 |
| Residual o-DCB (ppm) | <5 | <5 | <5 | <5 |
| Solution YI | 18.5 | 18.1 | 18.2 | 18.2 |
| Amine end groups (mole %) | 0.117 | 0.291 | 0.226 | 0.305 |
| Anhydride end groups (mole %) | 1.651 | 1.003 | 0.995 | 0.851 |
| Extrudate $M_w$ (AMU) | 27600 | 28900 | 28800 | 28200 |
| Extrudate $M_n$ (AMU) | 12600 | 13000 | 13000 | 12900 |
| Extrudate PDI | 2.19 | 2.27 | 2.22 | 2.18 |
| $T_g$ (° C.) | 256 | 255 | 257 | 256 |

*TLTM = too low to measure

EXAMPLES 34–37

This experiment used an oligomer solution similar to that described in Preparative Example 5. It was continuously fed to an extruder from the titanium reactor in which it was prepared. The extruder was a 25 millimeter diameter co-rotating intermeshing twin-screw extruder with fourteen barrels (L/D=56), a two-hole die plate, and two vents upstream of oligomer addition and four vents downstream of oligomer addition. Conveying screw elements were used under the feed and all vents. Screw kneading blocks were used in the reaction zones between vents. Oligomer was fed just upstream of barrel 5. Vents at barrels 1, 4, and 7 were connected to house vacuum (ca. 50 mm Hg of absolute pressure) with a shell-and-tube condenser. The vent at barrel 9 was connected to its own vacuum pump (ca. 25 mm Hg of absolute pressure) and cold trap, and the vents at barrels 11 and 13 shared a vacuum pump (ca. 25 mm Hg of absolute pressure) and cold trap. All barrels were set to a temperature of 375° C. The oligomer solution was fed by a gear pump from the reactor, which was maintained at 180° C. Extrusion conditions and results are summarized in Table 7 (extrusion conditions were not recorded for Example 37). The results show that polyimides of high molecular weight, low polydispersity, and low residual solvent can be prepared using the method of the invention. The low concentration of amine end groups in the polyimide suggests that the polymerization reaction in the extruder was nearly complete.

TABLE 7

|  | Ex. 34 | Ex. 35 | Ex. 36 | Ex. 37 |
|---|---|---|---|---|
| Oligomer solution feed rate (kg/hour) | 12.7 | 12.7 | 12.7 | — |
| Torque (%) | 91 | 92 | 93 | — |
| Melt Temperature at die (° C.) | 401 | 400 | 402 | — |
| Screw speed (rpm) | 195 | 195 | 195 | — |
| Die pressure (kilopascals) | 972 | 917 | 896 | — |
| Zone 1 temperature (° C.) | 319 | 324 | 328 | — |
| Zone 2 temperature (° C.) | 370 | 370 | 370 | — |
| Zone 3 temperature (° C.) | 337 | 335 | 335 | — |
| Zone 4 temperature (° C.) | 375 | 375 | 375 | — |
| Zone 5 temperature (° C.) | 376 | 375 | 375 | — |
| Zone 6 temperature (° C.) | 375 | 375 | 375 | — |
| Zone 7 temperature (° C.) | 375 | 371 | 370 | — |
| Zone 8 temperature (° C.) | 370 | 370 | 370 | — |
| Die face temperature (° C.) | 359 | 360 | 370 | — |
| Residual o-DCB (ppm) | 181 | 208 | 175 | 170 |
| Solution YI | 50.3 | 59.9 | 48.5 | 46.6 |
| Amine end groups (mole %) | 0.066 | 0.039 | 0.023 | 0.140 |
| Anhydride end groups (mole %) | 0.954 | 1.044 | 1.023 | 0.897 |
| Extrudate $M_w$ (AMU) | 34500 | 35500 | 34800 | 34900 |
| Extrudate $M_n$ (AMU) | 15200 | 15200 | 15300 | 15100 |
| Extrudate PDI | 2.27 | 2.33 | 2.27 | 2.30 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of preparing a polyimide, comprising:
   introducing to an extruder an oligomer mixture comprising a solvent and an oligomer formed by the reaction of a dianhydride compound and a diamine compound;
   removing solvent from the oligomer mixture via a vent in the extruder; and
   melt kneading the oligomer to form a polyimide.

2. The method of claim 1, wherein the oligomer mixture is an oligomer solution.

3. The method of claim 1, wherein the oligomer comprises amic acid repeating units having the structure

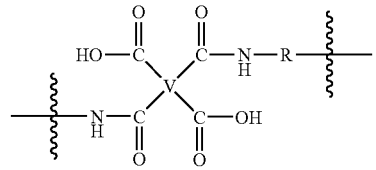

wherein V is a tetravalent linker selected from (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof; and
   R is a substituted or unsubstituted divalent organic radical selected from (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula

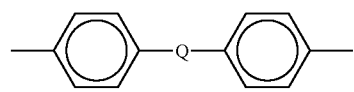

wherein Q is a divalent moiety selected from —O—, —S—, —C(O)—, —SO$_2$—, —C$_y$H$_{2y}$—, and halogenated derivatives thereof, wherein y is an integer from 1 to 5.

4. The method of claim 3, wherein the oligomer further comprises at least one imidized repeating unit having a structure selected from

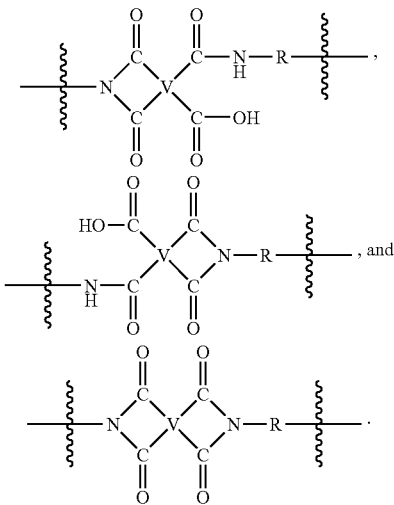

5. The method of claim 4, wherein the oligomer comprises a number average of at least three repeating units.

6. The method or claim 1, wherein the oligomer comprises repeating units baying the structure

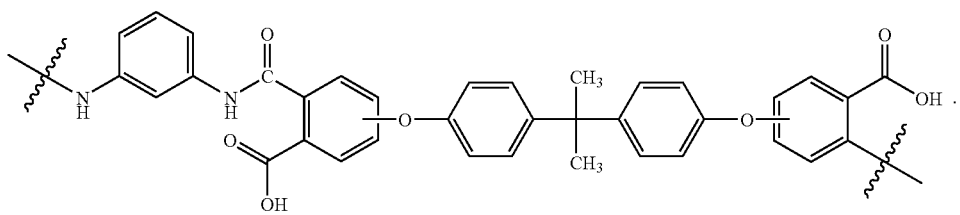

7. The method of claim 1, wherein the oligomer comprises repeating units having the structure

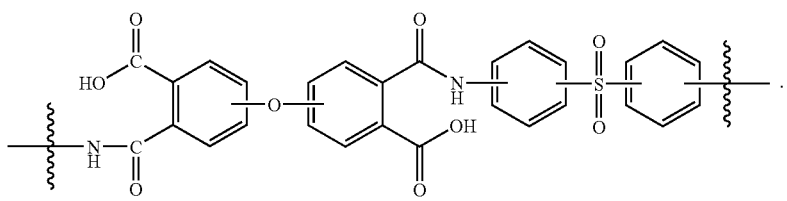

8. The method of claim 1, wherein the oligomer is formed from co-oligomerization of at least three monomers selected from bisphenol A dianhydride, 4,4'-oxy-diphthalic anhydride, meta-phenylenediamine, and diaminodiphenylsulfone.

9. The method of claim 1, wherein the oligomer has a weight average molecular weight of about 5,000 to about 40,000 atomic mass units.

10. The method of claim 1, wherein the oligomer mixture comprises about 5 to about 90 weight percent of the oligomer.

11. The method of claim 1, wherein the solvent is selected from halogenated aromatic solvents, halogenated aliphatic solvents, non-halogenated aromatic solvents, non-halogenated aliphatic solvents, and mixtures thereof.

12. The method of claim 1, wherein the solvent comprises a halogenated aromatic solvent.

13. The method of claim 1, wherein the solvent comprises ortho-dichlorobenzene.

14. The method of claim 1, wherein the oligomer mixture comprises about 10 to about 95 weight percent of the solvent.

15. The method of claim 1, wherein the polyimide comprises repeating units having the structure

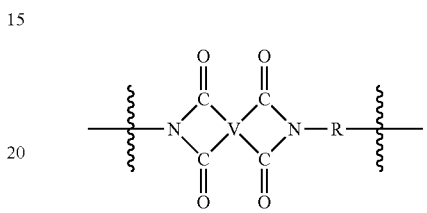

wherein V is a tetravalent linker selected from (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms, and (c) combinations thereof, wherein the substitutions are ethers, epoxides, amides, esters, or combinations thereof; and R is a substituted or unsubstituted divalent organic radical selected from (a) aromatic hydrocarbon radicals having about 6 to about 20 carbon atoms or halogenated derivatives thereof, (b) straight or branched chain alkylene radicals having about 2 to about 20 carbon atoms; (c) cycloalkylene radicals having about 3 to about 20 carbon atoms, and (d) divalent radicals of the general formula

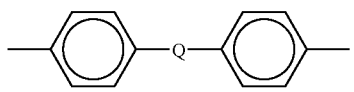

wherein Q is a divalent moiety selected from —O—, —S—, —C(O)—, —SO$_2$—, C$_y$H$_{2y}$—, and halogenated derivatives thereof, wherein y is an integer from 1 to 5.

16. The method of claim 1, wherein the polyimide is a polyetherimide.

17. The method of claim 1, wherein the polyimide is a polyetherimide comprising repeating units having the structure

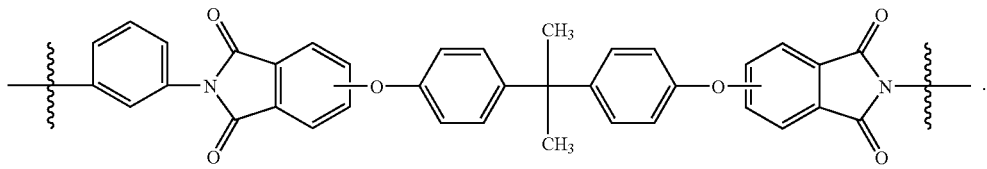

18. The method of claim 1, wherein the polyimide is a polyetherimide comprising repeating units having the structure

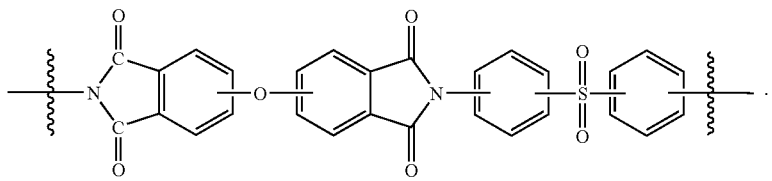

19. The method of claim 1, wherein the polyimide comprises a number average of repeating units at least two units greater than the number average of repeating units in the oligomer.

20. The method of claim 1, wherein the polyimide comprises a number average of repeating units at least 1.2 times greater than the number average of repeating units in the oligomer.

21. The method of claim 1, wherein the polyimide has a weight average molecular weight greater than 30,000 to about 80,000.

22. The method of claim 1, wherein the ratio of the polyimide weight average molecular weight to the oligomer weight average molecular weight is about 1.2 to about 10.

23. The method of claim 1, wherein the polyimide has a polydispersity index less than 4.

24. The method of claim 1, wherein the polyimide comprises less than 1,000 parts per million by weight of residual solvent.

25. The method of claim 1, wherein the polyimide comprises less than one mole percent of unreacted anhydride end groups.

26. The method of claim 1, wherein the polyimide comprises less than one mole percent of unreacted amine end groups.

27. The method of claim 1, wherein the oligomer mixture is superheated when it is introduced to the extruder.

28. The method of claim 1, wherein the oligomer mixture is introduced to the extruder via a feed inlet in fluid communication with the extruder.

29. The method of claim 28, wherein the vent is positioned upstream from the feed inlet.

30. The method of claim 28, wherein the feed inlet comprises a pressure control valve.

31. The method of claim 30, wherein the pressure control valve has a cracking pressure of about 0.07 kgf/cm$^2$ to about 25 kgf/cm$^2$.

32. The method of claim 28, wherein the oligomer mixture is introduced to the extruder via a feed inlet positioned on a side feeder attached to the extruder.

33. The method of claim 1, wherein the vent is positioned on a side feeder attached to the extruder.

34. The method of claim 1, wherein melt kneading the oligomer comprises melt kneading at a barrel temperature in the range of about 280 to about 400° C.

35. The method of claim 1, wherein the extruder is a twin-screw counter-rotating extruder, a twin-screw co-rotating extruder, a single-screw extruder, or a single-screw reciprocating extruder.

36. The method of claim 1, characterized by a ratio of oligomer mixture introduction rate, in kilograms per hour, to extruder screw speed, in rotations per minute, of about 0.005 to about 50.

37. The method of claim 1, further comprising removing solvent from the oligomer mixture before introducing it to the extruder.

38. The method of claim 1, further comprising adding a dianhydride compound and/or a diamine compound to the oligomer mixture prior to introducing the oligomer mixture to the extruder.

39. The method of claim 1, further comprising adding a stripping agent to the extruder.

40. The method of claim 1, further comprising adding nitrogen to the extruder.

41. The method of claim 1, further comprising melt filtering the polyimide.

42. The method of claim 1, further comprising filtering the oligomer mixture prior to introducing it to the extruder.

43. The method of claim 1, farther comprising adding to the extruder, downstream from oligomer mixture introduction, a polymer selected from polycarbonates, poly(arylene ether)s, polyesters, polysulfones, polyetherketone, polyolefin, polysiloxane, poly(alkenyl aromatic)s, liquid crystalline polymers, and mixtures thereof.

44. The method of claim 43, wherein the polymer is added in the form of a polymer mixture comprising the polymer and a solvent.

45. The method of claim 1, further comprising adding to the extruder, downstream from oligomer mixture introduction, a pigment, additive, process aid, conductive filler, non-conductive filler, fibrous filler, or mixture thereof.

46. The method of claim 1, further comprising introducing the polyimide into a second extruder.

47. A method of preparing a polyimide, comprising:
introducing to an extruder an oligomer mixture comprising an oligomer and a solvent, wherein the oligomer mixture is superheated;
removing solvent from the oligomer mixture via a vent upstream from oligomer mixture introduction and a vent downstream from oligomer mixture introduction; and
melt kneading the oligomer to form a polyetherimide.

48. The method of claim 47, wherein said removing solvent from the oligomer mixture comprises removing solvent via at least two vents downstream from solution introduction.

49. The method of claim 47, wherein the vent upstream from oligomer mixture introduction is maintained at a pressure in the range of about 10 to about 760 millimeters of mercury.

50. The method of claim 47, wherein the vent downstream from oligomer mixture introduction is maintained at a pressure of about 10 to about 500 millimeters of mercury.

51. A method of preparing a polyetherimide, comprising:
introducing to an extruder an oligomer mixture comprising an oligomer and a solvent, wherein the oligomer is formed by the reaction of bisphenol A dianhydride and meta-phenylenediamine, wherein the solvent comprises ortho-dichlorobenzene, and wherein the oligomer mixture is superheated;
removing solvent from the oligomer mixture via a vent upstream from oligomer mixture introduction, at least one vent downstream from oligomer mixture introduction, and at least one vent still further downstream from oligomer mixture introduction; wherein the vent upstream from oligomer mixture introduction is maintained at a pressure in the range of about 10 to about 760 millimeters of mercury, the vent downstream from oligomer mixture introduction is maintained at a pressure of about 250 to about 500 millimeters of mercury, and the vent still further down stream from oligomer mixture introduction is maintained at a pressure of about 10 to about 100 millimeters of mercury; and
melt kneading the oligomer to form a polyetherimide comprising less than 1000 parts per million by weight of residual solvent.

52. A method of preparing a polyimide, comprising:
reacting a dianhydride compound and a diamine compound in the presence of a solvent to form an oligomer mixture comprising an oligomer and a solvent;
introducing the oligomer mixture to an extruder;
removing solvent from the oligomer mixture via a vent in the extruder; and
melt kneading the oligomer to form a polyimide.

53. A polyimide prepared according to the method of claim 1.

54. A polyimide prepared according to the method of claim 47.

55. A polyimide prepared according to the method of claim 51.

56. A polyimide prepared according to the method of claim 52.

* * * * *

UNITED STATES PATENT AND TRADEMARK OFFICE
CERTIFICATE OF CORRECTION

PATENT NO. : 7,053,168 B2  Page 1 of 1
APPLICATION NO. : 10/683226
DATED : May 30, 2006
INVENTOR(S) : Norberto Silvi et al.

It is certified that error appears in the above-identified patent and that said Letters Patent is hereby corrected as shown below:

Column 35,
Lines 4-5, after "polysulfones", delete "polyetherketone, polyolefin, polysiloxane" and insert therefor -- polyetherketones, polyolefins, polysiloxanes--.

Signed and Sealed this

Twenty-first Day of November, 2006

JON W. DUDAS
*Director of the United States Patent and Trademark Office*